United States Patent
Iwamatsu et al.

(10) Patent No.: US 9,160,715 B2
(45) Date of Patent: Oct. 13, 2015

(54) SYSTEM AND METHOD FOR CONTROLLING ACCESS TO A DEVICE ALLOCATED TO A LOGICAL INFORMATION PROCESSING DEVICE

(71) Applicant: FUJITSU LIMITED, Kawasaki-shi, Kanagawa (JP)

(72) Inventors: Noboru Iwamatsu, Kawasaki (JP); Yotaro Konishi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 74 days.

(21) Appl. No.: 14/187,672

(22) Filed: Feb. 24, 2014

(65) Prior Publication Data

US 2014/0298444 A1    Oct. 2, 2014

(30) Foreign Application Priority Data

Mar. 28, 2013   (JP) ................................. 2013-070313

(51) Int. Cl.
*H04L 29/06*    (2006.01)

(52) U.S. Cl.
CPC ............ *H04L 63/0281* (2013.01); *H04L 63/10* (2013.01)

(58) Field of Classification Search
CPC ............................ H04L 63/0281; H04L 63/10
USPC .................... 709/220, 223, 224; 726/1, 12
See application file for complete search history.

(56) References Cited

U.S. PATENT DOCUMENTS

| | | | |
|---|---|---|---|
| 6,760,339 B1 * | 7/2004 | Noel et al. | 370/401 |
| 6,807,582 B1 * | 10/2004 | Muschenborn | 709/252 |
| 6,868,092 B1 * | 3/2005 | Bell et al. | 370/503 |

(Continued)

FOREIGN PATENT DOCUMENTS

| | | |
|---|---|---|
| JP | 2010-526358 | 7/2010 |
| JP | 2011-128994 | 6/2011 |

(Continued)

OTHER PUBLICATIONS

Patent Abstracts of Japan, Publication No. 2011-128994, Published Jun. 30, 2011.

(Continued)

*Primary Examiner* — Haresh N Patel
(74) *Attorney, Agent, or Firm* — Staas & Halsey LLP

(57) ABSTRACT

A logical information-processing device is allocated based on a request from a terminal device. In an information-processing device, one of plural storage devices is connected to one of plural processing devices each including a managing unit. First correspondence information stores physical identification information identifying the information-processing device in association with address information of the managing unit. Second correspondence information stores the physical identification information in association with logical identification information identifying the logical information-processing device. A managing device obtains address information of the managing unit of the information-processing device corresponding to the logical information-processing device allocated to the terminal device, by using the physical identification information obtained, based on the logical identification information included in the request, from the second correspondence information. A proxy device accesses the managing unit of the corresponding information-processing device based on the address information obtained by the managing device.

15 Claims, 17 Drawing Sheets

(56) References Cited

U.S. PATENT DOCUMENTS

| | | | |
|---|---|---|---|
| 6,880,086 B2* | 4/2005 | Kidder et al. | 713/191 |
| 6,934,749 B1* | 8/2005 | Black et al. | 709/224 |
| 7,020,696 B1* | 3/2006 | Perry et al. | 709/223 |
| 7,024,469 B1* | 4/2006 | Chang et al. | 709/220 |
| 7,062,642 B1* | 6/2006 | Langrind et al. | 713/1 |
| 7,111,053 B1* | 9/2006 | Black et al. | 709/220 |
| 7,130,870 B1* | 10/2006 | Pecina et al. | 709/223 |
| 7,143,153 B1* | 11/2006 | Black et al. | 709/223 |
| 7,222,147 B1* | 5/2007 | Black et al. | 709/200 |
| 7,225,240 B1* | 5/2007 | Fox et al. | 709/223 |
| 7,240,364 B1* | 7/2007 | Branscomb et al. | 726/9 |
| 7,263,597 B2* | 8/2007 | Everdell et al. | 712/11 |
| 7,266,595 B1* | 9/2007 | Black et al. | 709/223 |
| 7,349,960 B1* | 3/2008 | Pothier et al. | 709/224 |
| 7,506,368 B1* | 3/2009 | Kersey et al. | 726/12 |
| 8,060,926 B1* | 11/2011 | Ebrahimi et al. | 726/12 |
| 8,171,287 B2* | 5/2012 | Villela | 713/168 |
| 8,613,041 B2* | 12/2013 | Hopen et al. | 726/1 |
| 2002/0095487 A1* | 7/2002 | Day et al. | 709/223 |
| 2002/0116485 A1* | 8/2002 | Black et al. | 709/223 |
| 2002/0165961 A1* | 11/2002 | Everdell et al. | 709/225 |
| 2003/0126195 A1* | 7/2003 | Reynolds et al. | 709/203 |
| 2003/0131082 A1* | 7/2003 | Kachi | 709/220 |
| 2003/0149753 A1* | 8/2003 | Lamb | 709/223 |
| 2008/0256607 A1 | 10/2008 | Janedittakarn et al. | |
| 2009/0013385 A1* | 1/2009 | Olczak | 726/4 |
| 2009/0172802 A1* | 7/2009 | Mosek et al. | 726/12 |
| 2010/0049823 A1* | 2/2010 | Saigo et al. | 709/216 |
| 2012/0066428 A1* | 3/2012 | Miyoshi | 710/311 |
| 2014/0298444 A1* | 10/2014 | Iwamatsu et al. | 726/12 |
| 2015/0026287 A1* | 1/2015 | Stevens et al. | 709/212 |

FOREIGN PATENT DOCUMENTS

| | | |
|---|---|---|
| JP | 2012-58898 | 3/2012 |
| JP | 2012-103931 | 5/2012 |

OTHER PUBLICATIONS

Patent Abstracts of Japan, Publication No. 2012-058898, Published Mar. 22, 2012.

Patent Abstracts of Japan, Publication No. 2012-103931, Published May 31, 2012.

* cited by examiner

FIG. 9

| USER ID | LOGICAL SERVER ID | SERVICE PROCESSOR USE AUTHORITY | | | SERVICE PROCESSOR LOGIN ID |
|---|---|---|---|---|---|
| | | Web UI | SSH | REMOTE CONSOLE | |
| 0 | 0 | True | True | False | DCAdmin |
| 0 | 1 | True | True | False | DCAdmin |
| 0 | 2 | True | True | False | DCAdmin |
| 1 | 0 | False | False | True | ConsoleUser |
| 1 | 2 | False | False | True | ConsoleUser |
| ... | ... | ... | ... | ... | ... |

SYSTEM AND METHOD FOR CONTROLLING ACCESS TO A DEVICE ALLOCATED TO A LOGICAL INFORMATION PROCESSING DEVICE

CROSS-REFERENCE TO RELATED APPLICATION

This application is based upon and claims the benefit of priority of the prior Japanese Patent Application No. 2013-070313, filed on Mar. 28, 2013, the entire contents of which are incorporated herein by reference.

FIELD

The embodiments discussed herein are related to system and method for controlling access to a device allocated to a logical information processing device.

BACKGROUND

Infrastructure as a service (IaaS) is a service which provides, via a network, a server as an information processing device placed at a data center (or provides a virtual machine to be executed on a server as an information processing device). Platform as a service (PaaS) and software as a service (SaaS) provide an application interface (API) and a software environment. In contrast, IaaS is differentiated from other cloud services as a mode providing a server (virtual machine) itself as a hardware resource.

Furthermore, according to the mode of provision, IaaS may be classified into IaaS which provides a virtual machine (virtual IaaS) and IaaS which provides a physical server (physical IaaS).

In the virtual IaaS, with the use of a software function, it is easy to increase and decrease the number of virtual machines and change the structure of the virtual machine itself (such as the number of central processing units (CPUs) and memory capacity). A user of the virtual IaaS is allowed to use a desired server resource for a desired time via a terminal device, and is billed according to use results.

By contrast, the physical IaaS is an extension of a server hosting service in the past. It is often the case that a system of the physical IaaS is constructed by placing a physical server configured as specified by the user at a data center and the system is used by the user from outside the data center. The performance of the physical IaaS is higher than that of the virtual IaaS because the physical server is occupied by the user. However, unlike the virtual IaaS, it is not possible to share physical server resources as hardware resources among a plurality of users and use as many physical server resources as the users desire for a desired time.

Meanwhile, in recent years, a server has a management processor called a service processor (also referred to as a base management controller (BMC)) mounted on a motherboard of the server. The service processor is an independent system different from an operating system (OS) to be executed by a CPU of the server, and manages the server itself. The service processor normally has a network interface different from a network interface of a server body. The service processor is connected to a network (hereinafter referred to as a management network) different from a network to be used by a system on the server (hereinafter referred to as a business network).

The service processor provides functions such as obtaining a server state, controlling power supply, and serving as a remote console, and is managed by another management server on the management network in a centralized manner.

In the physical IaaS, the user constructs a system on the physical server, and uses that system or provides that system to a third party. The user also operates the power supply of the server in use, and manages the server via the remote console. Thus, an access from a network outside the data center to the service processor is permitted.

In the physical IaaS system where the system configuration is fixed, the server to be accessed by the user from outside the data center and the physical server (and the service processor) actually placed in the data center uniquely correspond to each other. A service processor login ID for the user to use the service processor, authority to use functions for each service processor login ID, and so forth are set individually for the service processor.

Japanese National Publication of International Patent Application No. 2010-526358, Japanese Laid-open Patent Publication No. 2012-103931, Japanese Laid-open Patent Publication No. 2012-58898, and Japanese Laid-open Patent Publication No. 2011-128994 are examples of related art.

SUMMARY

According to an aspect of the invention, a system is provided where a logical information processing device is allocated based on a request from a terminal device. The system includes: an information processing device in which one of a plurality of storage devices is connected to one of a plurality of processing devices each including a managing unit; a first storage unit configured to store first correspondence information that stores physical identification information identifying the information processing devices in association with address information of the managing unit; a second storage unit configured to store second correspondence information that stores the physical identification information in association with logical identification information identifying the logical information processing device; a managing device configured to acquire address information of the managing unit of the information processing device corresponding to the logical information processing device allocated to the terminal device, by using the physical identification information that is obtained from the second correspondence information based on the logical identification information included in the request; and a proxy device configured to access the managing unit of the corresponding information processing device, based on the address information acquired by the managing device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of data structure of user information stored in a user DB, according to an embodiment;

DESCRIPTION OF EMBODIMENTS

In recent years, however, there is a server system as an information processing system where physical servers and hard disk drives (HDDs) are separable from each other and an HDD to be connected is switched among a plurality of servers, thereby making it possible to quickly replace the system of the physical server.

In the server system as described above, a limited number of physical servers are shared among a plurality of users, and the system of each server is switched (an HDD to be connected is replaced) in a time division manner. With this, the physical servers may be provided quickly like virtual machines. This system allows efficient use of the server resources.

When a plurality of users use and share a physical server in a time division manner from respective terminal devices for use by the users, a logical server for providing a service to the user via the terminal device and an actual physical server allocated in the data center may not match each other. For this reason, when the physical server allocated to the user in a time division manner is changed, the service processor to be logged in is changed accordingly. Also, the service processor is shared among a plurality of physical IaaS users via the terminal devices, and if the physical server to be allocated to a user is changed, authority to use the service processor is also changed. Moreover, when the physical server to be allocated to a user is changed, access settings between the business network and the management network are changed according to the state of service allocation to the user.

Therefore, in an embodiment, in an information processing system with an information processing device where any of a plurality of storage devices and any of a plurality of processing devices each including a managing unit are connected to each other, a technology is provided for facilitating management regarding access to a managing unit of a physical server upon request from a terminal device.

First Embodiment

First, an example of structure of a physical IaaS system where an HDD is incorporated in each physical server is described with reference to FIGS. 1 and 2. Also, the structure of a physical IaaS system where physical servers and HDDs are separated from each other is described with reference to FIGS. 3 to 16.

Figure 1:
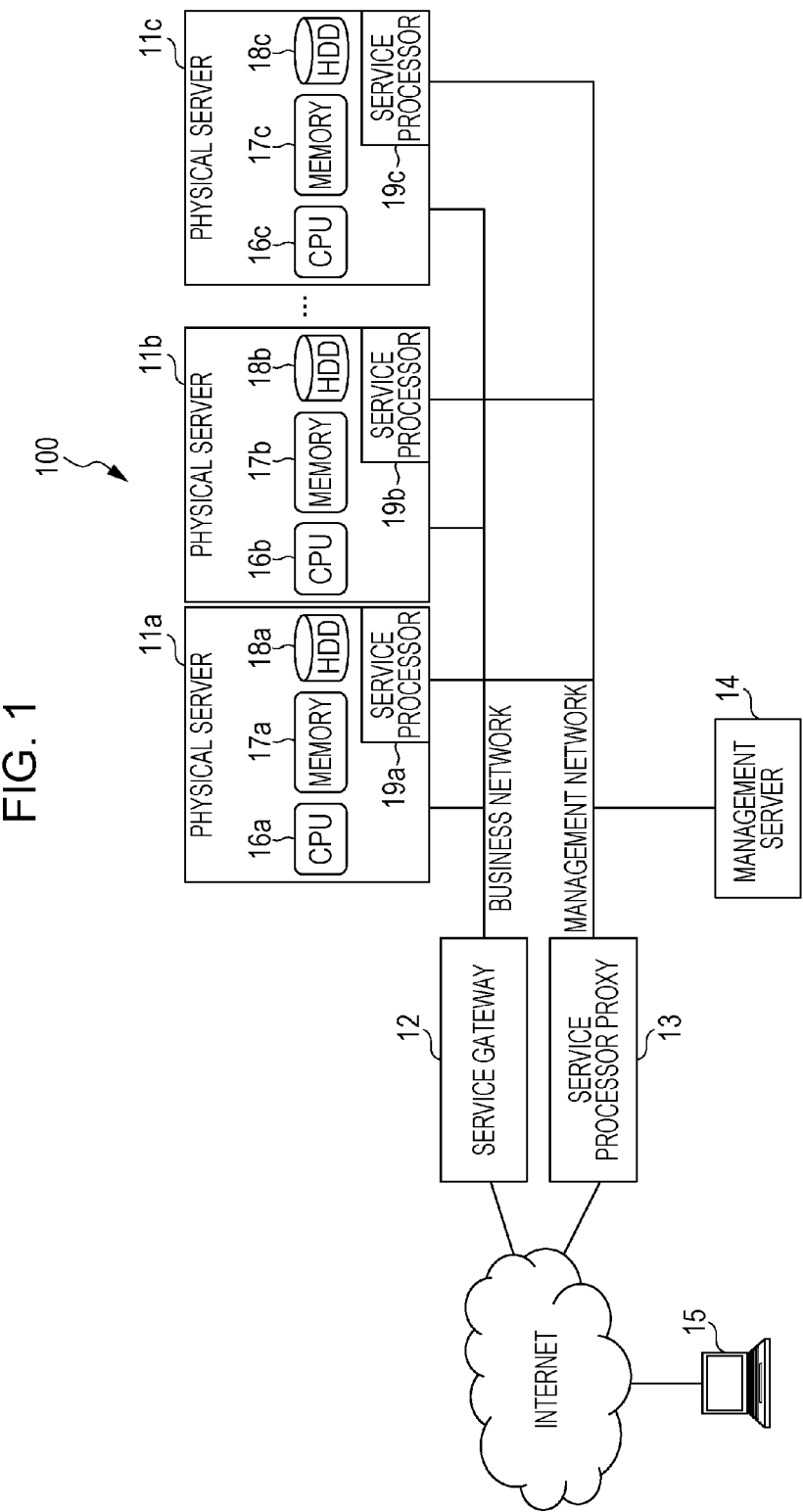
FIG. 1 depicts an example of structure of a physical IaaS where an HDD is incorporated in each physical server.

FIG. 1 depicts an example of structure of the physical IaaS where an HDD is incorporated in each physical server. A physical IaaS system 100 includes physical servers 11 (11a, 11b, and 11c), a service gateway 12, a service processor proxy 13, a management server 14, and a user terminal 15. The physical servers 11a, 11b, and 11c are collectively referred to as the physical server 11.

FIG. 1 depicts an example where the physical servers 11 and network resources to which the physical servers 11 are connected are lent to a user. The user operates the user terminal 15 to use the physical servers 11 and service processors 19 via a network. When accessing any physical server 11, the user terminal 15 goes through the service gateway 12. When accessing any service processor 19, the user terminal 15 goes through the service processor proxy 13. When the user logs in to any service processor 19 from the user terminal 15, authentication is performed at the service processor proxy 13. Information for use in authentication is stored in the management server 14.

The physical servers 11 are servers to be lent to the user terminal 15. Each physical server 11 includes a CPU 16 (16a, 16b, or 16c), a memory 17 (17a, 17b, or 17c), an HDD 18 (18a, 18b, or 18c), and a service processor 19 (19a, 19b, or 19c). However, the physical server 11 is not limited thereto, and may include various devices. The CPUs 16a, 16b, and 16c are collectively referred to as the CPU 16. The memories 17a, 17b, and 17c are collectively referred to as the memory 17. The HDDs 18a, 18b, and 18c are collectively referred to as the HDD 18. Furthermore, the service processors 19a, 19b, and 19c are collectively referred to as the service processor 19.

The CPU 16 performs various computations or control over each device in a system constructed in the physical server 11. The memory 17 is a main storage device for use when the CPU 16 performs various computations. The HDD 18 is an auxiliary storage device where data in the system constructed in the physical server 11 is stored. The service processor 19 provides functions such as obtaining a server state, controlling power supply, and serving as a remote console. The service processor 19 may also set a plurality of login IDs, and functions to be provided is set for each set login ID.

The service gateway 12 is a gateway which connects an external network (for example, the Internet) and a business network. The service gateway 12 is connected to each physical server 11 via the business network. The service gateway 12 is also connected to the user terminal 15 via the external network. A plurality of service gateways 12 may be configured.

The service processor proxy 13 is a proxy server for connecting the external network and a management network and functioning as a proxy that controls access from the external network to any service processor 19. The user terminal 15 present in the external network may not directly access any service processor 19 present in the management network, but makes access via the service processor proxy 13. The service processor proxy 13 manages access between the external network and the management network so that, for example, only a specific type of connection is permitted and unauthorized access from the external network is blocked. The service processor proxy 13 is connected to the service processor 19 of each physical server 11 via the management network. The service processor proxy 13 is also connected to the user terminal 15 via the external network. The service processor proxy 13 controls access from the external network to the management network. Authentication information stored in the management server 14 is used to control access. A plurality of service processor proxies 13 may be configured. In the following description, the service processor proxy 13 will be also referred to as the SP proxy 13.

The management server 14 is a server which manages authentication information by which the SP proxy 13 controls access from the Internet to the management network. The authentication information managed by the management server 14 includes, for example, login IDs and passwords of the service processors 19 to be used by the user.

The user terminal 15 is a computer to be operated when the user uses the lent physical IaaS system 100. The user terminal 15 is connected to the service gateway 12 and the SP proxy 13 via the external network. The user terminal 15 accesses any physical server 11 via the service gateway 12, and accesses any service processor 19 via the SP proxy 13.

The business network and the management network are configured to be separated from each other in order to enhance security. However, there may be the case where the management network is desired to be accessed from the business network. In this case, as described with reference to FIG. 2, the business network and the management network are connected to each other via a firewall 20.

Figure 2:
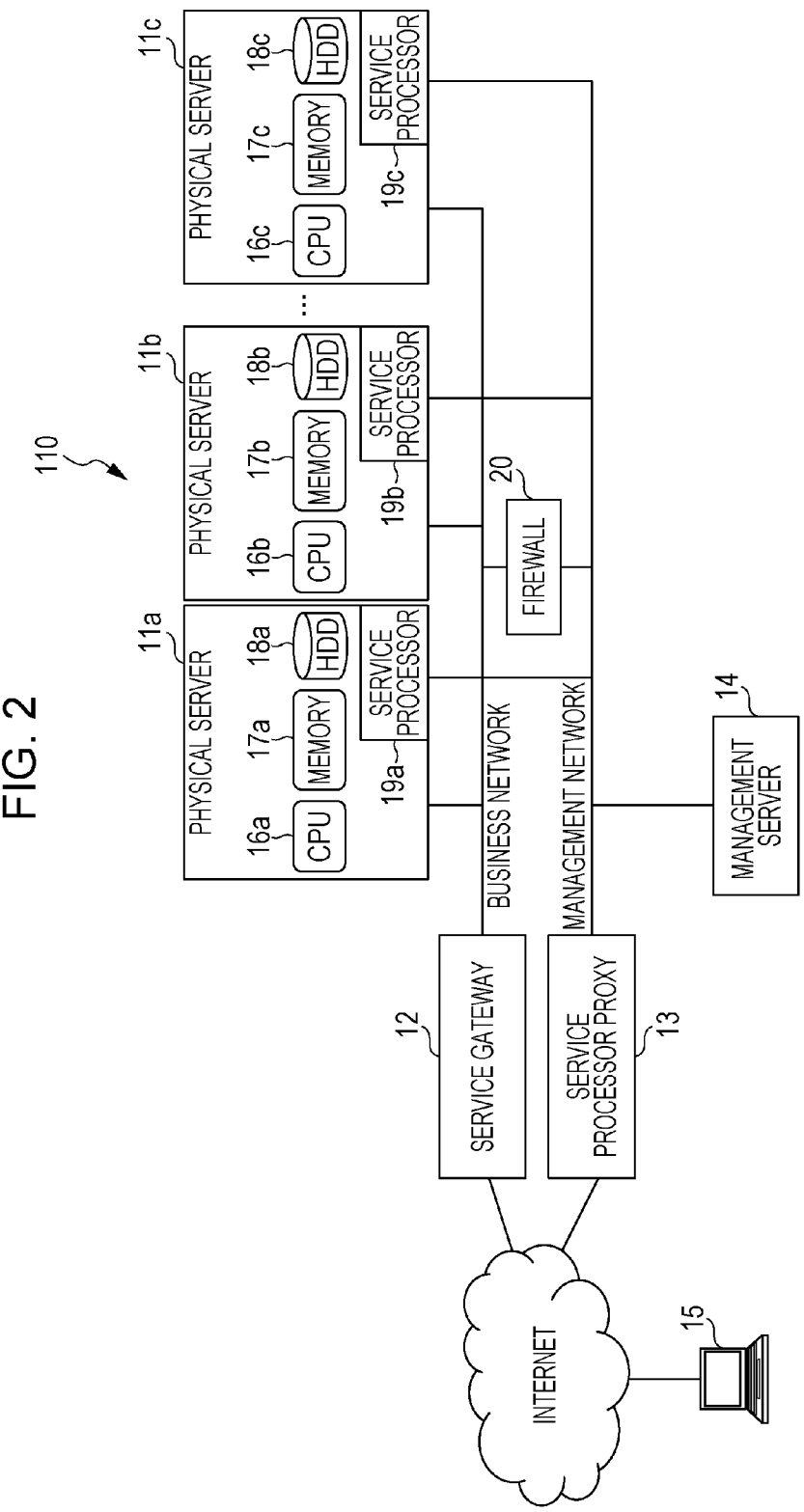
FIG. 2 depicts an example of structure of a physical IaaS where a business network and a management network are connected to each other via a firewall.

FIG. 2 depicts an example of structure of a physical IaaS where the business network and the management network are connected to each other via a firewall. A physical IaaS system 110 includes the physical servers 11, the service gateway 12, the SP proxy 13, the management server 14, the user terminal 15, and the firewall 20. The physical servers 11, the service gateway 12, the SP proxy 13, the management server 14, and the user terminal 15 are similar to those of the physical IaaS system 100 of FIG. 1.

In the physical IaaS system 110 of FIG. 2, the business network and the management network are connected to each other via the firewall 20. The firewall 20 controls access from the physical server 11 to the service processor 19. With this structure, the system on the business network is allowed to access the service processor 19 to monitor the state of the physical server 11 and operate power supply. Here, access control is performed by the firewall 20, and security of the physical IaaS system 110 may be ensured.

In FIGS. 1 and 2, the structure of the physical IaaS system where an HDD is incorporated in each physical server 11 is described.

Next, a physical IaaS system is described where a limited number of physical servers 11 are shared among a plurality of users and an idle server is provided in a time division manner according to a user's use request.

Figure 3:
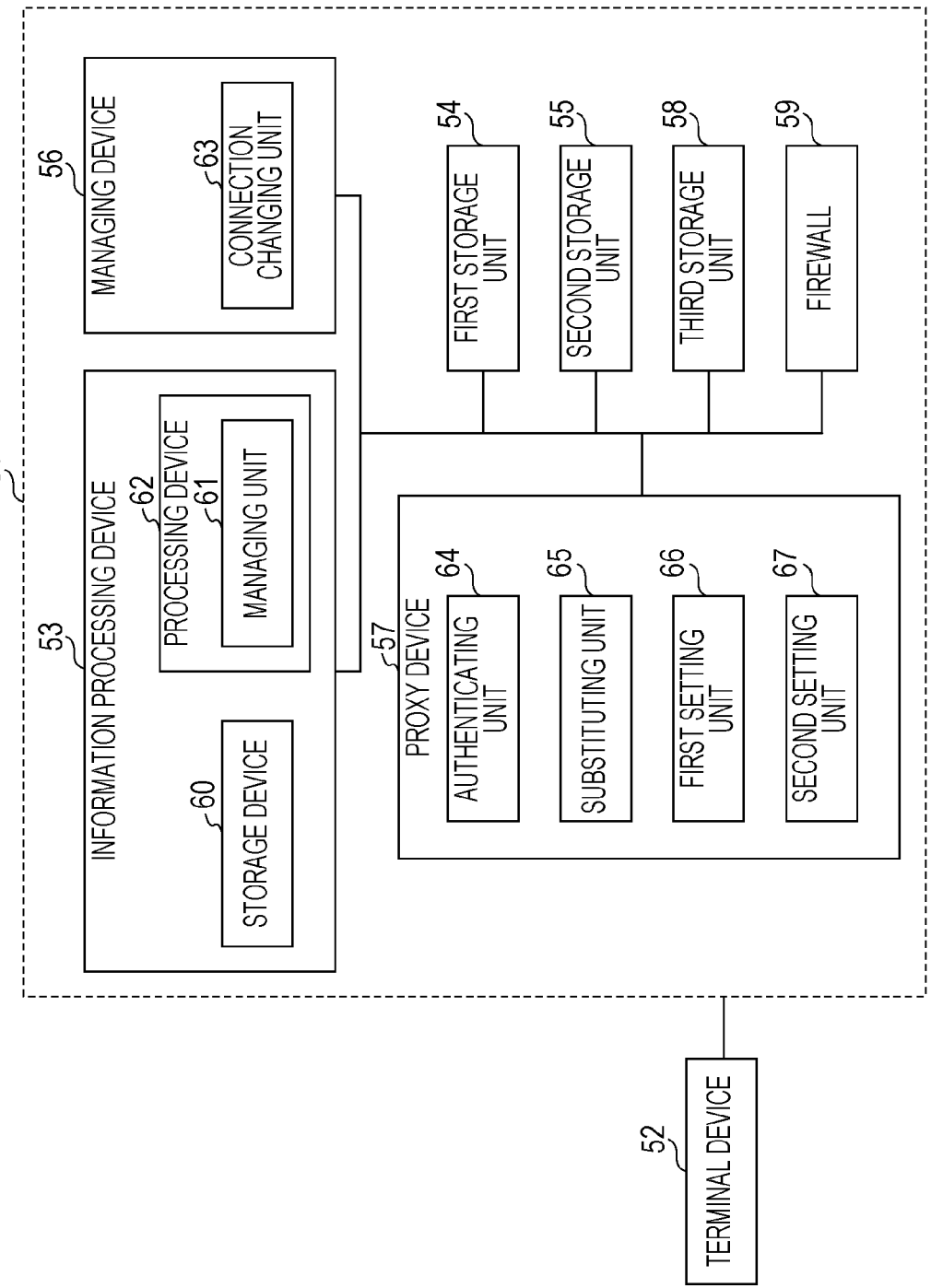
FIG. 3 is a diagram illustrating an example of structure of a physical IaaS, according to an embodiment.

FIG. 3 depicts an example of structure of an information processing system according to an embodiment. An information processing system 51 allocates a logical information processing device based on a request from a terminal device 52. The information processing system 51 includes an information processing device 53, a first storage unit 54, a second storage unit 55, a management device 56, a proxy device 57, a third storage unit 58, and a firewall 59.

Any one of processing devices 62 each including a managing unit 61 is connected to one of a plurality of storage devices 60, and the information processing device 53 may be configured to include the connected storage device 60 and processing device 62.

The first storage unit 54 stores therein first correspondence information that stores address information of the managing unit 61 in association with physical identification information identifying the information processing device 53.

The second storage unit 55 stores therein second correspondence information that stores logical identification information identifying a logical information processing device in association with the physical identification information.

Based on the logical identification information included in a request from the terminal device 52, the management device 56 obtains, from the first correspondence information, address information of the managing unit 61 of an information processing device 53 corresponding to the logical information processing device allocated to the terminal device 52, by using the physical identification information of the information processing device 53 obtained from the second correspondence information. The management device 56 includes a connection changing unit 63.

The connection changing unit 63 changes the second correspondence information according to the change of the connection between the storage device 60 and the processing device 62. Also, when the storage device 60 corresponding to the logical information processing device and a predetermined processing device 62 are connected to each other based on a request from the terminal device 52, the connection changing unit 63 also changes the second correspondence information so as to associate the logical identification information of the logical information processing device corresponding to the connected storage device 60 with the physical identification information of the connected information processing device 53. Furthermore, when the connection between the storage device 60 corresponding to the logical information processing device and the processing device 62 is cancelled based on a request from the terminal device 52, the connection changing unit 63 changes the second correspondence information so as to cancel the correspondence between the logical identification information of the logical information processing device corresponding to the storage device 60 whose connection is canceled and the physical identification information of the information processing device 53 whose connection is canceled.

The proxy device 57 accesses the managing unit 61 of the corresponding information processing device 53 based on the address information obtained by the management device 56. The proxy device 57 includes an authenticating unit 64, a substituting unit 65, a first setting unit 66, and a second setting unit 67.

The authenticating unit 64 authenticates the terminal device 52 based on authority information as information about use authority over the managing unit 61 for each terminal device 52, the information being stored in the third storage unit 58. When authentication is successful, based on the logical identification information included in the request from the terminal device 52, the management device 56 uses the physical identification information obtained from the second correspondence information to obtain, from the first correspondence information, address information of the managing unit 61 of the information processing device 53 corresponding to the logical information processing device allocated to the terminal device 52.

The substituting unit 65 substitutes for the terminal device 52 to log in to the managing unit 61 corresponding to the address information obtained by the managing device 56. In a login state, based on the address information obtained by the managing device 56, the proxy device 57 then provides an interface for accessing the managing unit 61 of the corresponding information processing device 53.

The first setting unit 66 sets use authority over the managing unit 61 corresponding to the address information. Then, based on the address information obtained by the managing device 56, the proxy device 57 accesses the managing unit 61 of the corresponding information processing device 53 with the set use authority.

The second setting unit 67 sets the firewall 59 so as to permit access from a network interface of the processing device 62 to the managing unit 61 of the corresponding information processing device 53. Then, the proxy device 57 provides information for the network interface of the processing device 62 that has obtained an access permission from the second setting unit 67, to access the managing unit 61 of the corresponding information processing device 53.

The third storage unit 58 stores therein authority information, which is information on use authority over the managing unit 61 for each terminal device 52.

The firewall 59 connects a connection network of the network interface of the processing device 62 and a connection network of a network interface of the managing unit 61.

In the physical IaaS system depicted in FIGS. 1 and 2, each physical server 11 allocates a system area where data about an OS and so forth is stored in the built-in HDD 18. Here, the built-in HDD 18 is used as a local disk of the physical server 11 and the connection of the HDD 18 is not allowed to be switched among the plurality of physical servers 11.

By contrast, there is a physical IaaS system where an HDD storing therein a system area of one physical server 11 is separable from the physical server 11 and connectable to another physical server 11. By switching and changing the HDD to be connected to the physical server 11, the system of the physical server 11 is quickly replaceable. Also, HDDs may be set in a pool and managed separately from the physical servers 11, and any HDD and physical server 11 may be connected and combined via high-speed interconnection when desired to be used, thereby providing flexibility as in virtualization technology without impairing original functions and performance of the hardware.

Figure 4:
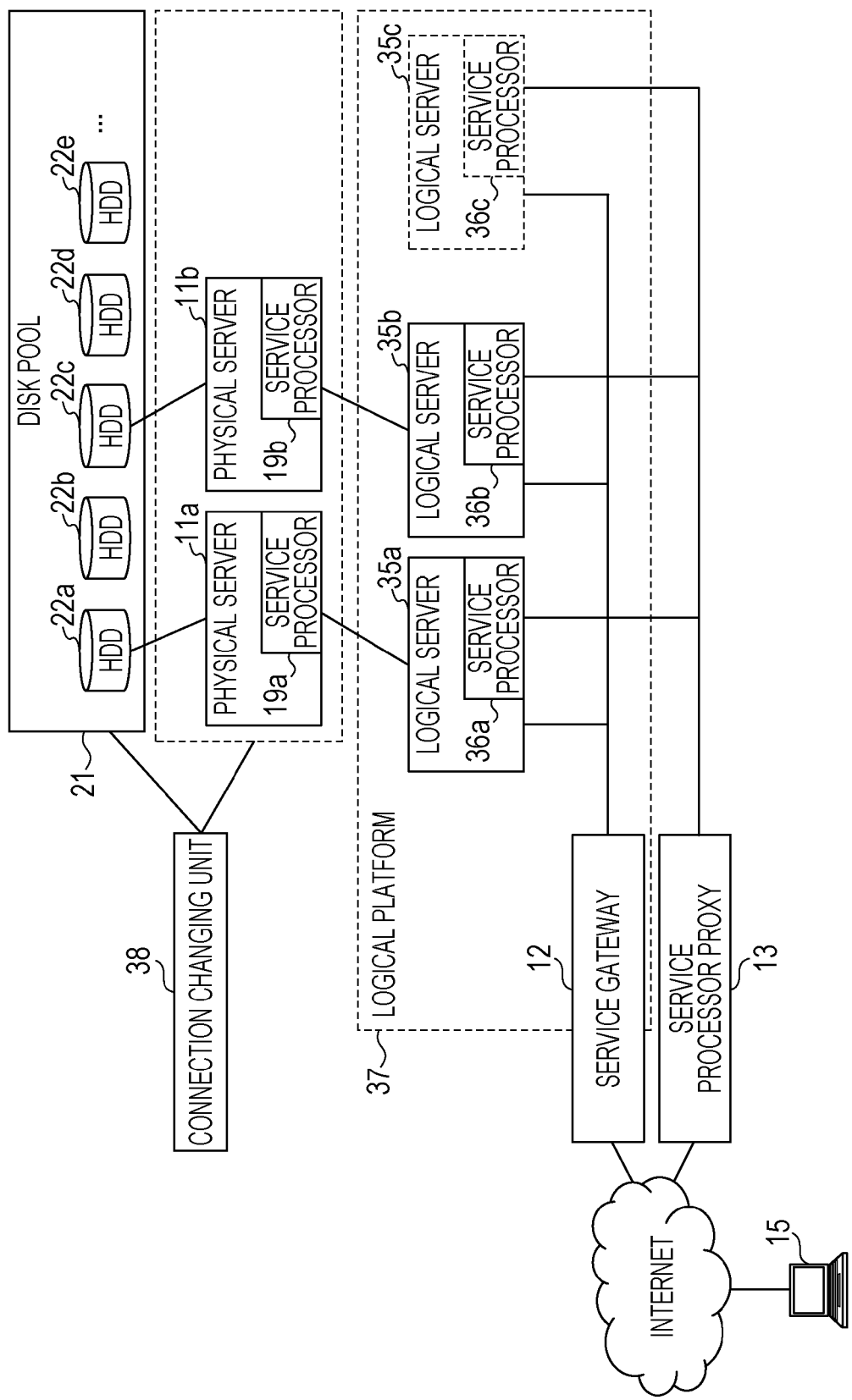
FIG. 4 is a diagram illustrating an example of logical system structure of a physical IaaS system where physical servers and HDDs are separated from each other, when viewed from a user's point of view, according to an embodiment.

FIG. 4 depicts an example of logical system structure of a physical IaaS where physical servers and HDDs are separated from each other, when viewed from a user's point of view.

A physical IaaS system 120 includes the physical servers 11, the service gateway 12, the SP proxy 13, the user terminal 15, a disk pool 21, logical servers 35 (35a, 35b, and 35c), and a connection changing unit 38. The logical servers 35a, 35b, and 35c are collectively referred to as the logical server 35.

A difference from FIG. 1 is that the physical servers 11 and HDDs 22 are separated from each other and the HDDs 22 are managed as the disk pool 21. The connection between the physical servers 11 and the HDDs 22 is switchable by the connection changing unit 38.

A user makes a lending request when desiring to use a resource (such as a logical server), and returns the lent resource after use. This allows the physical servers 11 to be shared among the plurality of users.

When making a resource lending request to the physical IaaS system 120, the user defines a logical system as a system to be lent, where a plurality of logical servers are connected via a network (this system is hereinafter referred to as a logical platform). The logical platform to be lent includes a plurality of logical servers, and a network structure where these logical servers are connected is defined.

When the user makes a request for lending a logical platform 37, the physical server 11 in the data center and the HDD 22 where the system of the logical server 35 to be lent is stored are connected to each other by the connection changing unit 38. Based on this connection, the physical server 11 is associated with the logical server 35.

The HDD 22 including the logical server 35 not included in the logical platform 37 is not connected to the physical server 11. Also, the structure may be such that the HDD 22 including the logical server 35 not used by the user from among the logical servers 35 of the logical platform 37 is not connected to the physical server 11.

In the example of FIG. 4, the logical platform 37 defined by the user includes the logical servers 35a to 35c. In the example of FIG. 4, if the logical server 35c is not used, the logical server 35c and any physical server 11 are not brought into correspondence with each other, and any HDD 22 where the system of the logical server 35c is stored is not connected to the physical server 11.

The user terminal 15 may access the logical servers 35 via the service gateway 12. The user terminal 15 may also access service processors 36 (36a, 36b, and 36c) via the SP proxy 13.

Access from the user terminal 15 to the proxy server is performed by, for example, connecting to a Web page of the proxy server by using a dedicated application installed in the user terminal 15 or a Web browser of the user terminal 15. For connection, selection of the logical server 35 and selection of the function of the service processor 36 of the logical server 35 may be performed by the user via the user terminal 15.

By using a virtual local area network (VLAN) or the like to separate the business network which connects the physical servers 11, the network connecting the logical servers 35 is set so as to be isolated for each user's logical platform 37 to be lent. The VLAN is set by the connection changing unit 38.

When finishing the use of the logical platform 37, the user may return the lent resources. When a return request is issued, the connection between the physical server 11 and the HDD 22 of the logical server 35, the setting of the VLAN of the business network, and so forth are cancelled by the connection changing unit 38. Accordingly, the correspondence between the relevant logical server 35 and physical server 11 is cancelled.

Figure 5:
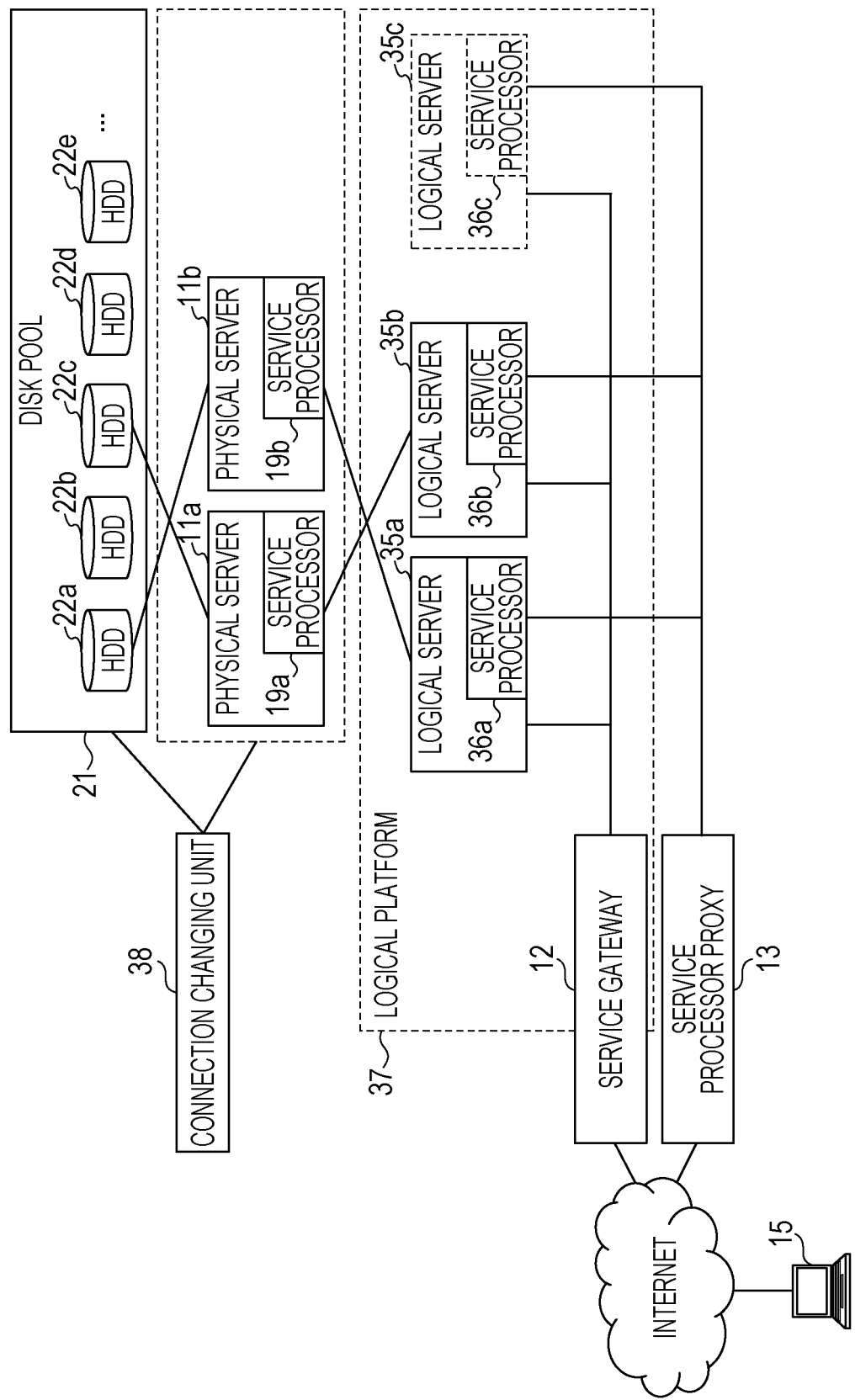
FIG. 5 is a diagram illustrating an example of a case where HDDs are allocated to different physical servers, according to an embodiment.

Even if the user once returns the logical server 35 and again makes a request for lending the same logical server 35, the HDD 22 corresponding to the logical server 35 may not be allocated to the same physical server 11 at the time of previous lending. FIG. 5 is a diagram for describing the case where HDDs are allocated to a physical server different from the previously allocated one. With reference to FIGS. 4 and 5, an example is described where the HDDs 22 are allocated to physical servers 11 different from the previously allocated physical servers 11.

In FIGS. 4 and 5, it is assumed that data about the system of the logical server 35a is stored in the HDD 22a and the data about the system of the logical server 35b is stored in the HDD 22c. In FIG. 4, the HDD 22a is allocated to the physical server 11a, and the HDD 22c is allocated to the physical server 11b. Therefore, the physical server 11a is a physical server 11 corresponding to the logical server 35a, and the physical server 11b is a physical server 11 corresponding to the logical server 35b.

By contrast, in FIG. 5, the HDD allocated to the physical server 11 is different from the HDD in FIG. 4. That is, the HDD 22c is allocated to the physical server 11a, and the HDD 22a is allocated to the physical server 11b. In this case, the physical server 11c is a physical server 11 corresponding to the logical server 35a, and the physical server 11a is a physical server 11 corresponding to the logical server 35b.

As such, once the logical platform 37 is returned from the user, allocation of the HDD 22 where the system of the logical server 35 is stored, to the physical server 11 may be changed. When allocation of the HDD 22 to the physical server 11 is changed, the correspondence between a physical server 11 and a logical server 35 is also changed. Furthermore, the correspondence between a service processor 19 integrally and inseparably mounted on the physical server 11 and a logical server 35 becomes different.

The user is aware of up to a logical server 35 in the logical platform 37 and is not aware of which physical server 11 a logical server 35 is actually associated with and which HDD 22 a physical server 11 is associated with. That is, even if the correspondence between the physical server 11 and the logical server 35 is actually changed after the logical platform 37 is returned, the user may not change a method of connection to the service processor or change settings at the user terminal 15.

Figure 6:
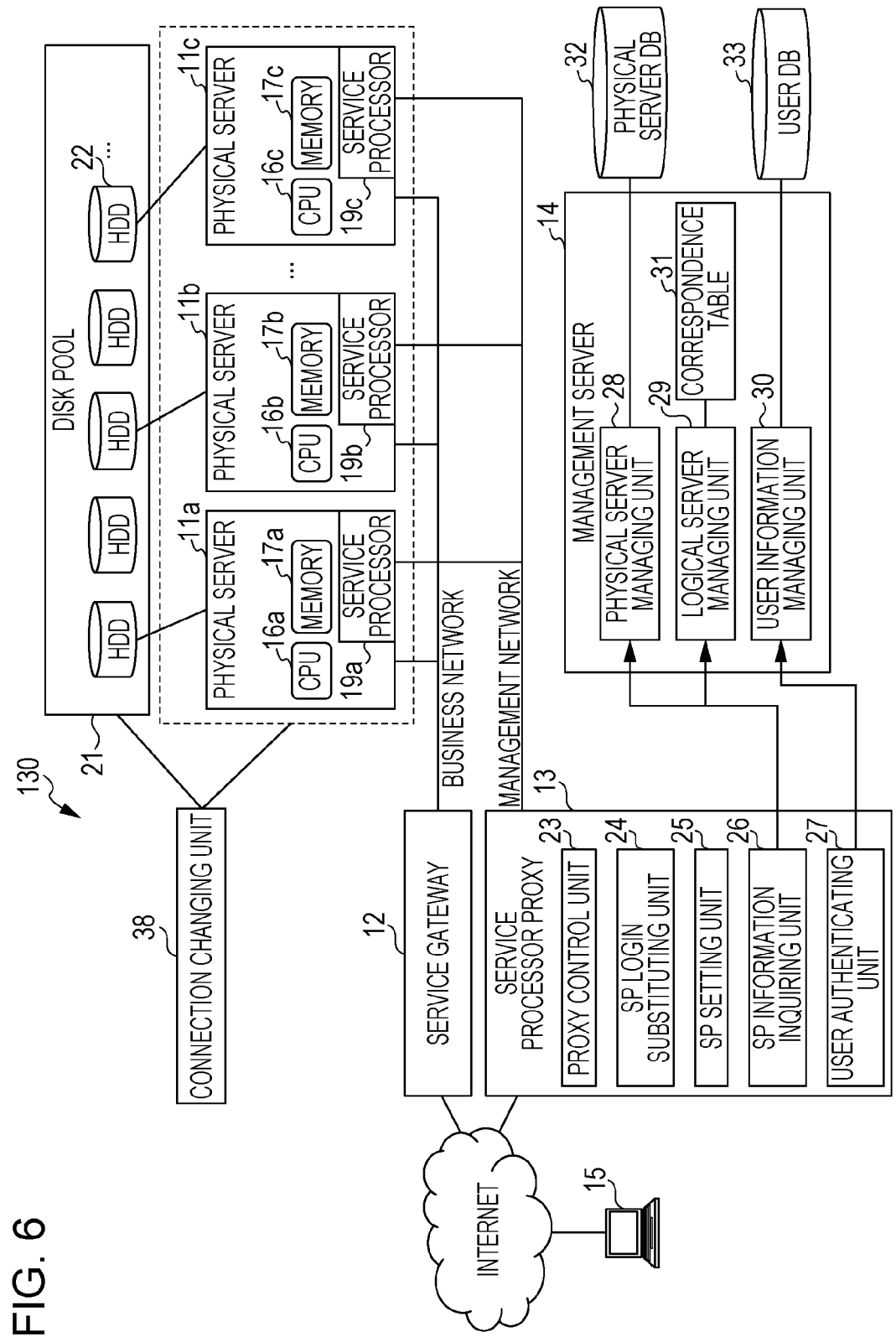
FIG. 6 is a diagram illustrating an example of structure of a physical IaaS where physical servers and HDDs are separated from each other, according to an embodiment.

FIG. 6 depicts an example of structure of a physical IaaS system where physical servers and HDDs are separated from each other. A physical IaaS system 130 includes the physical server 11, the service gateway 12, the SP proxy 13, the management server 14, the user terminal 15, the disk pool 21, a physical server database 32, a user database 33, and the connection changing unit 38.

The user terminal 15 is similar to that described in FIG. 1. The physical server 11 includes the CPU 16, the memory 17, and the service processor 19. Also, the physical server 11 is connected via interconnection to one or a plurality of HDDs 22 in the disk pool 21. In the data center, the physical servers 11 are managed based on, for example, the position on a rack or a unique ID such as a MAC address or IP address. The CPU 16, the memory 17, and the service processor 19 are similar to those described in FIG. 1.

The disk pool 21 includes the plurality of HDDs 22. In each HDD 22, data about the logical server 35 allocated to the user is stored. The HDD 22 may be a semiconductor memory such as a solid state drive (SDD) or flash memory, or may be any of various storage devices.

The connection changing unit 38 constructs a server system on demand according to requirements from the user. Since physical components themselves are pooled for assembly, overhead is suppressed without involvement of a virtualization layer as in the case of constructing a virtual server.

Upon receiving a request from the user for lending the logical platform 37, the connection changing unit 38 allocates a HDD 22 included in the disk pool 21 to the physical server 11. In addition to the allocation of the HDD 22, the connection changing unit 38 also sets the network of the logical server 35 included in the logical platform 37. Furthermore, upon receiving a request from the user for returning the logical platform 37, the connection changing unit 38 cancels the allocation of the HDD 22 to the physical server 11. In addition to allocation cancelling, the connection changing unit 38 also cancels the settings of the network set at the time of lending.

Specifically, the connection changing unit 38 allocates a HDD 22 to the physical server 11 by connecting the HDD 22 where the system of the logical server 35 is stored, to the physical server 11 when a request for lending the logical platform 37 comes from the user. The connection between the HDD 22 and the physical server 11 is switched by switching the connection between the HDD 22 and the physical server 11 via interconnection. If the system of the logical server 35 has already been stored in the HDD 22 connected to the physical server 11, that logical server 35 becomes available in the connected physical server 11. To which physical server 11 the HDD 22 where the data about the logical server 35 requested to be lent is connected may be determined based on any of various methods. As a determination method, for example, the physical server 11 including the CPU 16 and the memory 17 which satisfy the specifications requested by the user may be determined to be a physical server 11 to which the HDD 22 is to be connected.

Specifically, regarding cancellation of the allocation of the HDD 22 to the physical server 11, when a request for returning the logical platform 37 comes from the user, the connection changing unit 38 cancels the allocation of the HDD 22 to the physical server 11 where the system of the logical server 35 is stored. The connection is canceled by switching the connection between the HDD 22 and the physical server 11 via interconnection. At the time of returning, only the connection between the HDD 22 and the physical server 11 is cancelled, and the data stored in the HDD 22 is not deleted. When a request for lending the same logical server 35 comes again from the same user, the HDD 22 where the data about the logical server 35 at the time of the previous returning request is stored is allocated to a predetermined physical server 11.

The network setting of the logical server 35 included in the logical platform 37 may be performed by, for example, performing VLAN setting associated with the logical platform 37 on a network switch to which a network interface of the physical server 11 is connected.

The physical server 11 and the HDD 22 are connected to each other via high-speed interconnection. Examples of connection modes include a connection with a storage area network (SAN), peripheral component interconnect (PCI) Express, and so forth with connection via a fiber channel or the like. Also, the physical server 11 and the disk pool 21 may be connected to each other via any of various relay devices such as a switch.

The connection changing unit 38 may allocate a plurality of HDDs 22 in the disk pool 21 assembled as redundant arrays of inexpensive disks (RAID) to a logical server 35.

The connection changing unit 38 may include a storage unit which stores information indicating the structure of the logical platform 37 for each user, information indicating in which HDD 22 the logical server 35 is stored, and information indicating the correspondence between the HDD 22 currently allocated and the physical server 11. By using the data stored in this storage unit, the connection changing unit 38 may construct a logical platform when receiving a request for lending the logical platform from a user. Also, by using the information indicating the correspondence stored in this storage unit, the connection changing unit 38 may manage the correspondence between the logical server 35 lent to the user and the HDD 22 where the data about that logical server 35 is stored.

The management server 14 manages information to be used by the SP proxy 13 when establishing a connection between the user terminal 15 and the service processor 19. The management server 14 manages information about the physical servers 11, the logical servers 35, and users, and provides information to the SP proxy 13 via the management network.

The management server 14 includes a physical server managing unit 28, a logical server managing unit 29, and a user information managing unit 30.

The physical server managing unit 28 manages information regarding the physical servers 11 in the physical IaaS system 130. The physical server managing unit 28 is connected to the physical server database 32 (hereinafter referred to as the physical server DB 32) where information about the physical servers 11 is stored, and stores and obtains information about the physical servers 11 (hereinafter referred to as physical server information) in and from the physical server DB 32.

Figure 7:
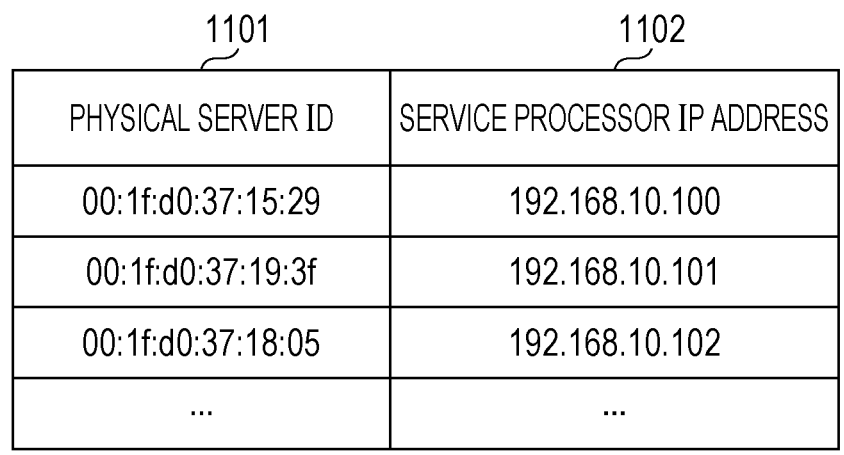
FIG. 7 is a diagram illustrating an example of physical server information stored in a physical server DB, according to an embodiment.

FIG. 7 depicts an example of physical server information stored in the physical server DB. The physical server information includes data items of a physical server ID 1101 and a service processor IP address 1102 (hereinafter referred to as the SP IP address 1102).

The physical server ID indicates identification information of the physical servers 11 included in the physical IaaS system 130. In the example of FIG. 7, IP addresses of the physical servers 11 are used as identification information of the physical servers 11. However, the identification information of the physical server is not restricted thereto, and may be any information with which the physical servers 11 are uniquely identifiable, for example, MAC addresses or host names.

The SP IP address 1102 stores therein IP addresses of the service processors 19 mounted on the physical servers 11 of the physical server ID 1101.

In the example of FIG. 7, the physical server information has a table structure. However, the physical server information may take any of various data structures as long as the physical server information includes information about the correspondence between the physical server ID 1101 and the SP IP address 1102.

Also, while the physical server information includes the physical server ID 1101 and the SP IP address 1102 in the example of FIG. 7, the physical server information may further include, for example, server structure information as a data item, such as the number of cores of the CPU of the server and memory capacity.

Next, description will be given of the operation of the physical server managing unit 28.

The physical server managing unit 28 receives from the SP proxy 13 an inquiry about the IP address of the service processor 19 corresponding to the physical server 11. The physical server managing unit 28 then refers to the physical server DB 32 to check the IP address of the service processor 19 corresponding to the physical server 11 for inquiry, and returns the result. In the example of FIG. 7, when receiving an inquiry about the IP address of the service processor 19 corresponding to the physical server ID 1101 of "00:1f:d0:37:15:29", the physical server managing unit 28 returns to the SP proxy 13 an IP address of "192.168.10.100" of the service processor 19.

The logical server managing unit 29 manages the correspondence between the logical servers 35 and the physical servers 11 by using a correspondence table 31. The correspondence between the logical servers 35 and the physical servers 11 indicates which physical server 11 the HDD 22 where the system of the logical server 35 is stored is connected to. Also, since the connection between the HDD 22 and the physical server 11 is made when a user's lending request occurs and is canceled when a returning request occurs, the logical server managing unit 29 manages the lending state of the physical servers 11 in the physical IaaS system 130.

Figure 8:
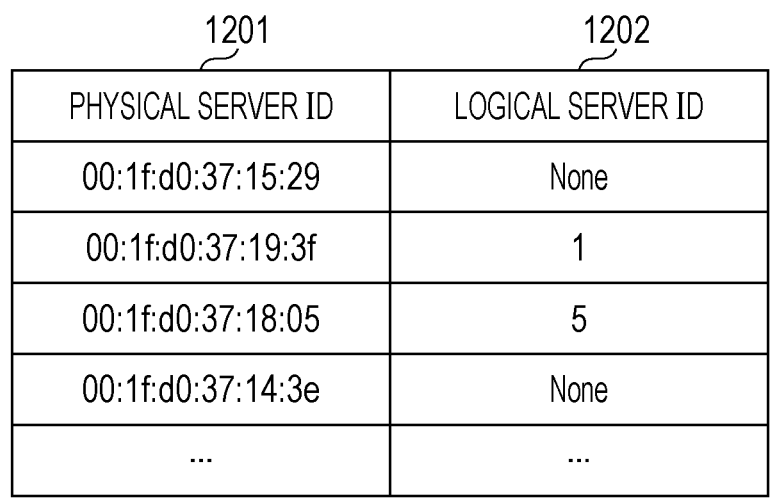
FIG. 8 is a diagram illustrating an example of data structure of a correspondence table, according to an embodiment.

FIG. 8 depicts an example of data structure of the correspondence table. The correspondence table 31 includes data items of a physical server ID 1201 and a logical server ID 1202. The correspondence table 31 is stored in a predetermined storage area of the management server 14.

The physical server ID 1201 indicates identification information of the physical servers 11. This physical server ID 1201 is similar to the physical server ID 1101 of the physical server information.

The logical server ID 1202 indicates identification information of the logical servers 35 associated with the physical servers 11 of the physical server ID 1201. In the example of FIG. 8, the logical server ID 1202 is indicated by a number uniquely provided to each of the logical servers 35 in the physical IaaS system 130. When the logical server 35 associated with the physical server 11 of the physical server ID 1201 is not present, the value of the logical server ID 1202 is "None".

In the example of FIG. 8, the correspondence table 31 has a table structure. However, the correspondence table 31 may take any of various data structures as long as the correspondence table 31 includes information about the correspondence between the physical server ID 1201 and the logical server ID 1202.

The logical server 35 may be associated with the logical platform 37 for each user. Also, the connection changing unit 38 may manage the correspondence between the physical servers 11 and the logical servers 35 by using the correspondence table 31.

Next, description will be given of the operation of the logical server managing unit 29.

Upon receiving from the SP proxy 13 an inquiry about the ID of the physical server 11 corresponding to the logical server 35, the logical server managing unit 29 refers to the correspondence table 31 to check the ID of the physical server 11 corresponding to the logical server 35 for inquiry, and returns the results. In the example of FIG. 8, when receiving an inquiry about the physical server ID 1201 corresponding to a value of "1" of the logical server ID 1201, the logical server managing unit 29 returns to the SP proxy 13 a corresponding physical server ID of "00:1f:d0:37:19:3f".

When the correspondence between the logical servers 35 and the physical servers 11 is changed, that is, when a lending request or a returning request from the user occurs, the logical server managing unit 29 receives information about the correspondence changed by the connection changing unit 38 and updates the information of the correspondence table 31. Thus, at the time of switching the connection between the physical servers 11 and the HDDs 22, the operator performs system operation without changing settings regarding a connection destination of the service processor 19.

The user information managing unit 30 manages information regarding the logical platform 37 defined by the user. The user information managing unit 30 is connected to a user database 33 (hereinafter referred to as the user DB 33) where information about the users is stored, and stores and obtains information about the users (hereinafter referred to as user information) in and from the user DB 33.

FIG. 9 depicts an example of data structure of the user information stored in the user DB. The user information includes data items of a user ID 1301, a logical server ID 1302, a service processor use authority 1303, and a service processor login ID 1304.

The user ID 1301 indicates identification information assigned to the user using the physical IaaS system 130. In the example of FIG. 9, the user ID 1301 is indicated by a number uniquely assigned to the user using the physical IaaS system 130.

The logical server ID 1302 indicates identification information assigned to the logical server 35. In the example of FIG. 9, the logical server ID 1302 is indicated by a number uniquely assigned to the logical server 35 to be lent to the user.

The service processor use authority 1303 is information indicating user's use authority over the service processor 19 corresponding to the logical server 35. In the example of FIG. 9, the service processor use authority 1303 stores therein information indicating whether use authorities over three functions of the service processor 19, that is, web user interface (Web UI), secure shell (SSH), and remote console, are present. The use authority of the service processor is not restricted to the example of FIG. 9, and any of various use authorities may be set, for example, telnet.

The service processor login ID 1304 is information about a login ID for use in authentication at the time of logging in to the service processor 19 corresponding to the logical server 35. The login ID may have a different value for each service processor use authority 1303, or may have a different value for each combination of the user ID 1301, the logical server ID 1302, and the service processor use authority 1303. In the example of FIG. 9, two login IDs of "DCAdmin" and "ConsoleUser" are depicted according to the use authority of the service processor 19, but these are not meant to be restrictive.

Next, the operation of the user information managing unit 30 is described.

Upon receiving from the SP proxy 13 an inquiry about user's use authority, the user information managing unit 30 refers to the user DB 33 to check user's use authority for inquiry, and returns the result. In the example of FIG. 9, when an instruction for inquiring about use authority over a logical server ID of "0" of a user ID "0" comes, the user information managing unit 30 returns information indicating that use authority over "Web UI" and "SSH" is present. Also, when returning the result upon inquiry, the user information managing unit 30 also returns a corresponding SP login ID. That is, in the example of FIG. 9, when an instruction for inquiring about use authority over a logical server ID of "0" of a user ID of "0" comes, information indicating an SP login ID of "DCAdmin" is also returned together with the use authority.

The service processor login ID 1304 may be a set of the service processor login ID and information for use in authentication at the time of logging in to the service processor 19. The information for use in authentication at the time of service processor login may be, for example, a password.

While the physical server DB 32 and the user DB 33 are depicted separately from the management server 14 in FIG. 6, the physical server DB 32 and the user DB 33 may be included in the management server 14.

In addition to those described with reference to FIG. 1, the SP proxy 13 substitutes to log in to the service processor 19, in response to a change of the correspondence between the physical servers 11 and the logical servers 35, and provides a measure for connecting the user terminal 15 and the service processor 19. By making an inquiry of the management server 14 about information about the physical server 11 corresponding to the current logical server 35, the SP proxy 13 specifies the address of the service processor 19 requested by the user to be used. When making a request for using the service processor 19, by merely specifying the logical server 35 as information about a connection destination, the user is able to connect with the corresponding service processor 19. That is, even if the correspondence between the physical servers 11 and the logical servers 35 is changed, the user's method of connecting to the service processor 19 is not changed.

The SP proxy 13 includes a proxy control unit 23, an SP login substituting unit 24, an SP setting unit 25, an SP information inquiring unit 26, and a user authenticating unit 27.

The proxy control unit 23 receives a request from the user terminal 15 for using the service processor 19, substitutes to log in to the service processor 19, and performs control to establish a session between the user terminal 15 and the service processor 19. The proxy control unit 23 relays data exchanges between the user terminal 15 and the service processor 19.

Here, the request for using the service processor 19 from the user terminal 15 includes the ID of the logical server 35 to be connected, user identification information, and connection mode.

The logical server ID for connection is identification information of the logical server 35 associated with the service processor 19 desired by the user to be connected. This logical server ID is assumed to correspond to the information about the logical server ID 1201 in the correspondence table 31 and the logical server ID 1302 in the user DB 33.

The user identification information is identification information of the user using the physical IaaS system 130. The user identification information may be, for example, the IP address of the user terminal 15 and may be inputted by the user at the time of making a use request. This user identification information is assumed to correspond to the information about the user ID 1301 in the user DB 33.

The connection mode is information indicating a connection mode desired by the user when using the service processor, and includes, for example, Web UI, SSH, remote console, and so forth, although the connection mode is not restricted thereto.

To substitute to log in to the service processor 19, specifically, the proxy control unit 23 first receives from the user a request for using the service processor 19. Then, upon receiving the use request, the proxy control unit 23 instructs the user authenticating unit 27 to authenticate the user, and receives the authentication result. When authentication by the user authenticating unit 27 is successful, the proxy control unit 23 instructs the SP information inquiring unit 26 to specify the service processor 19 requested by the user to be used, and receives the result. The proxy control unit 23 then instructs the SP setting unit 25 to provide user authority to the specified service processor 19. The proxy control unit 23 then instructs the SP login substituting unit 24 to log in to the service processor 19 to be connected, in a format corresponding to the information about the connection mode included in the use request. When login is successful, the proxy control unit 23 provides the user terminal 15 with a connection measure according to the information about the connection mode included in the use request. A specific method of providing a connection measure will be described further below.

The user authenticating unit 27 authenticates the user by checking whether the user making a request for using the service processor 19 has use authority over the service processor 19. Upon receiving an instruction for authenticating the user from the proxy control unit 23, the user authenticating unit 27 starts a user authenticating process.

Specifically, in a user authentication process, the user authenticating unit 27 first makes an inquiry of the user information managing unit 30 of the management server 14 about use authority of the user making the use request over the service processor 19 requested to be used. Here, the user authenticating unit 27 transmits to the user information managing unit 30 an instruction for inquiring about use authority and also the user's identification information included in the use request. The user authenticating unit 27 then receives the user's use authority and the service processor login ID from the user information managing unit 30. Next, based on the received user's use authority, the user authenticating unit 27 determines whether the user has authority indicated in the connection mode included in the use request. When determining that the user has authority indicated in the connection mode included in the use request, the user authenticating unit 27 determines that authentication is successful. On the other hand, when determining that the user does not have authority indicated in the connection mode included in the use request, the user authenticating unit 27 determines that authentication has failed. The user authenticating unit 27 then notifies the proxy control unit 23 of whether authentication is successful. When notifying that authentication is successful, the user authenticating unit 27 also notifies the proxy control unit 23 of the service processor login ID received from the user information managing unit 30.

The SP information inquiring unit 26 specifies the service processor 19 requested by the user to be used. When instructed from the proxy control unit 23 to specify the service processor 19 to be requested by the user to be used, the SP information inquiring unit 26 starts a process of specifying the service processor 19.

In the process of specifying the service processor 19, specifically, the SP information inquiring unit 26 first inquires of the logical server managing unit 29 of the management server 14 about the ID of the physical server corresponding to the logical server 35 requested to be used. Here, the SP information inquiring unit 26 transmits to the logical server managing unit 29 an instruction for inquiring about the ID of the physical server 11 and also the logical server ID for connection included in the use request. The SP information inquiring unit 26 then receives, as a reply for the inquiry, the ID of the physical server 11 corresponding to the logical server 35.

Upon receiving the ID of the physical server 11, the SP information inquiring unit 26 inquires of the physical server managing unit 28 of the management server 14 about the IP address of the service processor 19 corresponding to the ID of the physical server 11 received from the logical server managing unit 29. Here, the SP information inquiring unit 26 transmits to the physical server managing unit 28 an instruction for inquiring about the IP address of the service processor 19 and the ID of the physical server 11 received from the logical server managing unit 29. The SP information inquiring unit 26 then receives, as a reply for the inquiry, the IP address of the service processor 19 corresponding to the ID of the physical server 11 received from the logical server managing unit 29. The IP address received herein is an IP address of the service processor 19 corresponding to the logical server 35 requested by the user to be used.

The SP information inquiring unit 26 then notifies the proxy control unit 23 of the IP address of the service processor 19 corresponding to the logical server 35.

The SP setting unit 25 has management authority over the service processors 19, and sets the login ID to the service processor 19 over which the use authority is executable by the user. That is, the SP setting unit 25 changes authentication settings regarding login to the service processors 19 according to the allocation of the logical servers 35 to the physical servers 11.

Upon receiving an instruction for setting the service processor 19 from the proxy control unit 23, the SP setting unit 25 performs authentication (account) settings on the service processor 19 for login. Here, the SP setting unit 25 receives the instruction for authentication setting on the service processor 19 as well as the IP address of the service processor 19 for login and the service processor login ID. Here, the IP address of the service processor 19 is received by the SP information inquiring unit 26 from the physical server managing unit 28 of the management server 14. Also, the service processor login ID is received by the user authenticating unit 27 from the user information managing unit 30.

Specifically, the SP setting unit 25 sets the service processor 19 so that the user of the service processor login ID is able to use the function of the connection mode included in the use request. For example, the SP setting unit 25 creates an account for the service processor login ID, and provides authority over the function of the connection mode to the created account. In creating the account, authentication setting may be made, such as a password for use in authentication of the service processor login ID. Information such as a password set herein may be information received from the user information managing unit 30 together with the service processor login ID and for use in authentication at the time of login. Also, the SP setting unit 25 may newly add information indicating that the login ID set herein has been already set to the user DB 33 as a data item so that the information is associated with the service processor login ID 1304 of the user information of the user DB 33.

The SP login substituting unit 24 substitutes to perform an operation of logging in to the service processor 19 by the user terminal 15. When being instructed by the proxy control unit 23 to substitute to log in, the SP login substituting unit 24 logs in to the service processor 19 for login. Here, the SP login substituting unit 24 receives from the proxy control unit 23 the instruction for substituting to log in as well as the IP address of the service processor 19 for login and the service processor login ID. The SP login substituting unit 24 then logs in to the service processor 19 with the received IP address by using the service processor login ID.

Specifically, the SP login substituting unit 24 logs in to the service processor requested to be used by using the service processor login ID, in a format specified by the connection mode included in the use request. For example, when the remote console is specified as the connection mode, the SP login substituting unit 24 logs in via a Web screen.

Alternatively, authentication may be made when the SP login substituting unit 24 logs in to the service processor 19. For authentication, any of various authentication methods may be used, such as password authentication. In the case of password authentication, the SP login substituting unit 24 may receive the password together with the service processor login ID from the proxy control unit 23.

Figure 10:
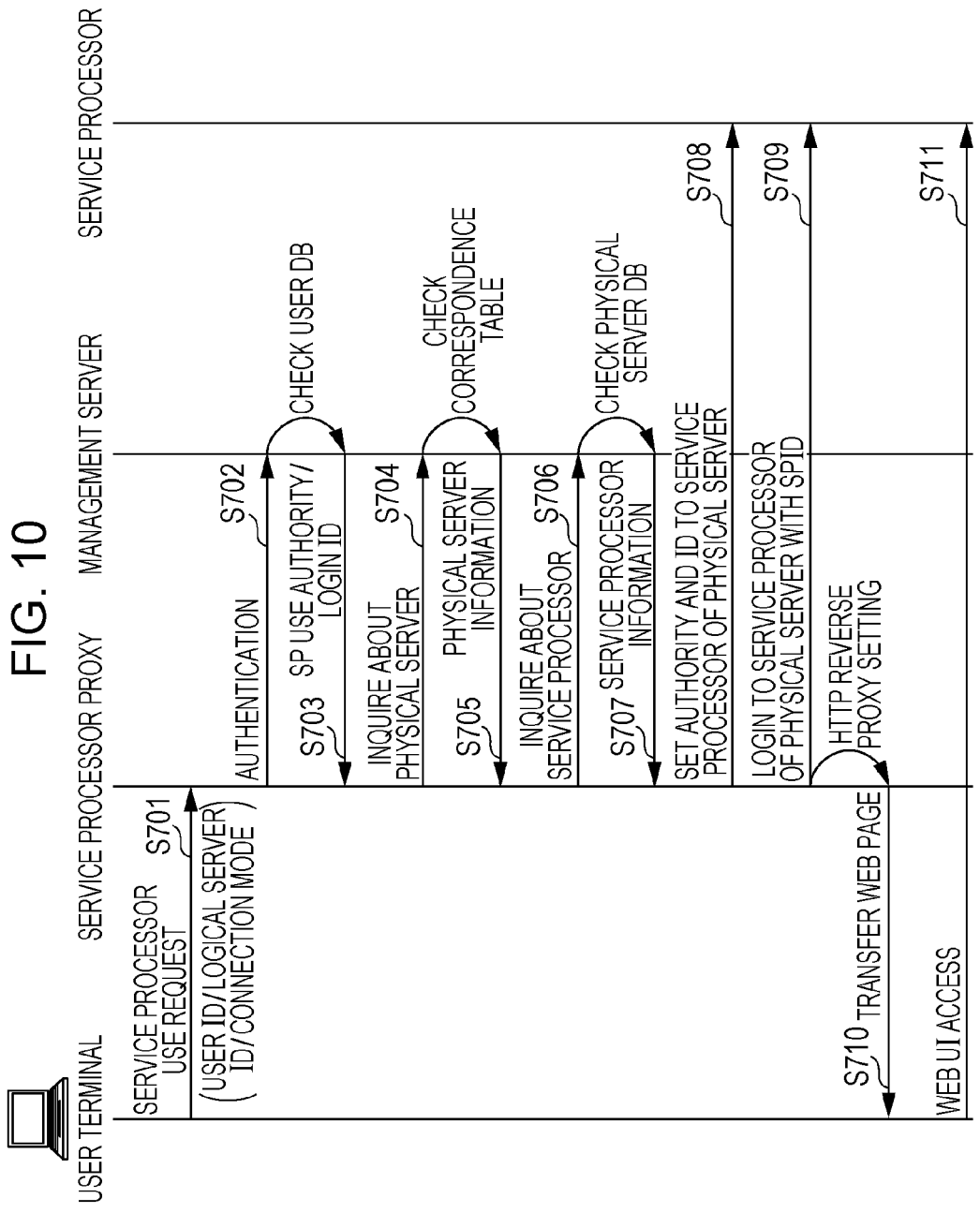
FIG. 10 is a diagram illustrating an example of an operation flow when a user using a user terminal makes a request for connection to a service processor with Web UI, according to an embodiment.

Next, an operation flow is described when the user using the user terminal 15 makes a request for connection to the service processor 19 with Web UI. FIG. 10 is an operation flow when the user using the user terminal makes a request for connection to a service processor with Web UI.

First, the user terminal 15 transmits a request for using the service processor 19 to the SP proxy 13 (S701). The use request includes the ID of the logical server 35 to be connected, user's identification information, and the connection mode.

Next, to authenticate the user, the SP proxy 13 inquires of the management server 14 about user's use authority (S702). That is, the user authenticating unit 27 of the SP proxy 13 inquires of the user information managing unit 30 of the management server 14 about use authority over the service processor 19 requested by the user to be used.

Upon receiving the inquiry, based on the information stored in the user DB 33, the management server 14 specifies user information and information about service processor use authority, and notifies the SP proxy 13 of the specified information (S703). Specifically, the user information managing unit 30 refers to the user DB 33 and notifies the user authenticating unit 27 of use authority over the service processor 19 requested to be used corresponding to the logical server 35 requested by the user to be used and the service processor login ID.

Upon receiving the notification from the user information managing unit 30, the user authenticating unit 27 determines, based on the received user's use authority, whether the user has authority indicated by the connection mode included in the use request. When it is determined that the user does not have authority, the proxy control unit 23 notifies the user terminal 15 that the user does not have authority, and the process ends. When it is determined that the user has authority, processes at S704 onward are performed.

Next, the SP proxy 13 inquires about the physical server 11 (S704). That is, the SP information inquiring unit 26 of the SP proxy 13 inquires of the logical server managing unit 29 of the management server 14 about the ID of the physical server 11 corresponding to the logical server 35 requested to be used.

Upon receiving the inquiry about the physical server ID, the management server 14 specifies information about the physical server 11 based on the correspondence table 31, and notifies the SP proxy 13 of the specified information (S705). Specifically, the logical server managing unit 29 of the management server 14 refers to the correspondence table 31 to specify the ID of the physical server 11 corresponding to the logical server 35 requested to be used. The SP information inquiring unit 26 is then notified of the specified physical server ID 1201.

Next, the SP proxy 13 inquires about the service processor 19 (S706). That is, the SP information inquiring unit 26 of the SP proxy 13 inquires of the physical server managing unit 28 of the management server 14 about the IP address of the service processor 19 corresponding to the physical server 11 specified at S705.

Upon receiving the inquiry about the service processor 19, the management server 14 specifies information about the service processor 19 based on the information stored in the physical server DB 32, and notifies the SP proxy 13 of the specified information (S707). Specifically, the physical server managing unit 28 of the management server 14 refers to the physical server DB 32 to specify the IP address of the service processor 19 corresponding to the physical server 11. The logical server managing unit 29 then notifies the SP information inquiring unit 26 of the specified IP address of the service processor 19.

Next, the SP proxy 13 sets the ID (account) of a login user and user authority of that ID to the service processor 19 of the physical server 11 (S708). That is, the SP setting unit 25 of the SP proxy 13 sets the service processor 19 so that the user with the service processor login ID notified at S703 may use the function of Web UI.

S708 and S709 may be omitted if the ID of the login user and user authority of that ID have already been set. The SP setting unit 25 of the SP proxy 13 may allow the user with the service processor login ID to use the function of Web UI not only by setting user authority but also by using any of various methods, such as creating a user account, or account-lock cancelling.

Next, the SP proxy 13 logs in to the service processor 19 of the physical server 11 with the service processor login ID (S709). That is, the SP login substituting unit 24 of the SP proxy 13 logs in to the service processor 19 requested to be used with the service processor login ID in a format specified by the connection mode included in the use request.

Next, the proxy control unit 23 of the SP proxy 13 sets an HTTP reverse proxy to transfer a Web page to the user terminal 15 (S710). Reverse proxy setting is made in a manner such that, for example, when http://[SP proxy 13]/userId/L-serverId/SP is accessed from the user terminal 15, a conversion to an access to http://[IP address of the service processor 19] of the management network is made and a transfer is performed.

Next, the user terminal 15 uses various functions of Web UI based on the Web page transferred at S710 (S711).

Figure 11:
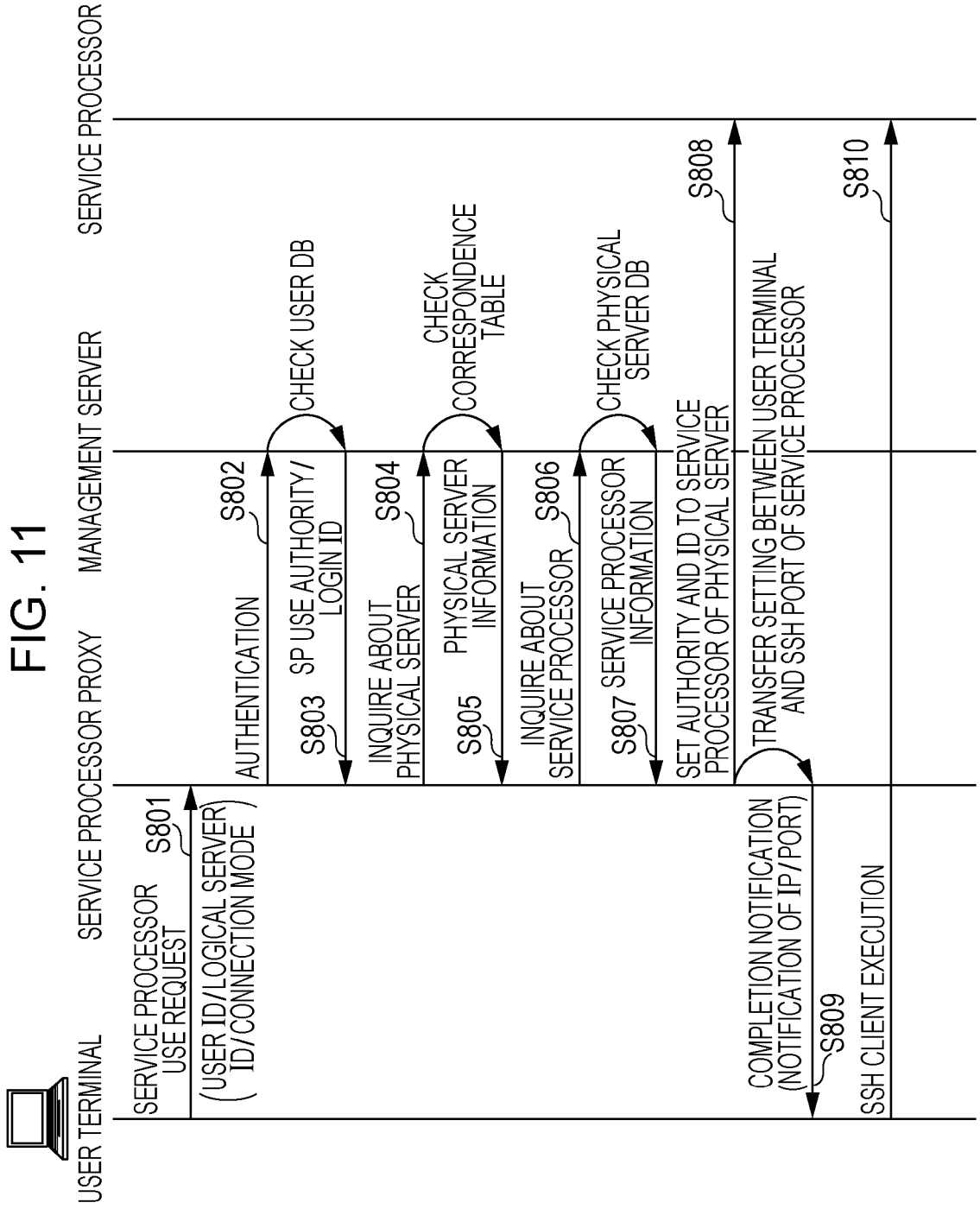
FIG. 11 is a diagram illustrating an example of an operation flow when a user using a user terminal makes a request for connection to a service processor with SSH, according to an embodiment.

Next, an operation flow is described when the user using the user terminal 15 makes a request for connection to the service processor 19 with SSH. FIG. 11 is an operation flow when the user using the user terminal makes a request for connection to a service processor with SSH. S801 to S807 are similar to S701 to S707, and therefore are not described herein.

When obtaining the IP address of the service processor 19 (S807), the SP proxy 13 sets the ID of a login user and user authority of that ID to the service processor 19 of the physical server 11 (S808). That is, the SP setting unit 25 of the SP proxy 13 sets the service processor 19 so that the user with the service processor login ID may use the function of SSH.

Next, the proxy control unit 23 of the SP proxy 13 performs transfer settings between SSH ports of the user terminal 15 and the service processor 19, and issues an SSH setting completion notification to the user terminal 15 (S809). The proxy control unit 23 connects to the service processor 19 with SSH, and connects to the user terminal 15 with SSH. The proxy control unit 23 then performs transfer setting to the SSH port connected to the service processor 19 and the SSH port connected to the user terminal 15 so that data is transferred between the SSH ports. The proxy control unit 23 then transmits to the user terminal 15 a notification indicating that SSH connection setting has been completed, together with information about an SSH transfer destination IP address (SP IP address 1102) and a transfer destination port.

Next, the user terminal 15 uses the information received at S809 for transfer to an SSH client for starting, thereby connecting to the service processor 19 with SSH (S810).

Figure 12:
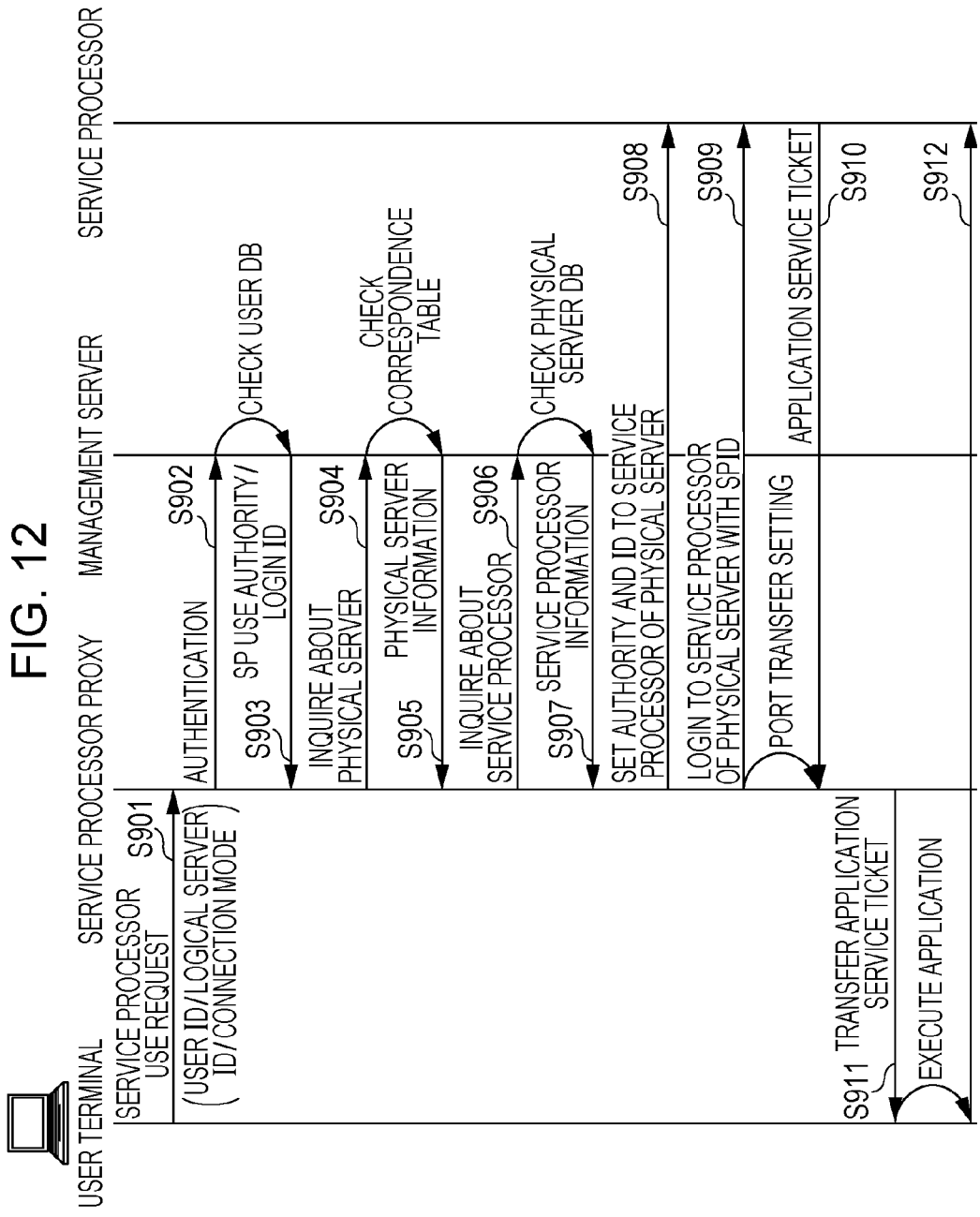
FIG. 12 is a diagram illustrating an example of an operation flow when a user using a user terminal makes a request for connection to a service processor with a remote console, according to an embodiment.

Next, an operation flow is described when the user using the user terminal 15 makes a request for connection to the service processor 19 with a remote console. FIG. 12 is an operation flow when the user using a user terminal makes a request for connection to a service processor with a remote console. S901 to S907 are similar to S701 to S707, and therefore are not described herein.

When obtaining the IP address of the service processor 19 (S907), the SP proxy 13 sets the ID of a login user and user authority of that ID to the service processor 19 of the physical server 11 (S908). That is, the SP setting unit 25 of the SP proxy 13 sets the service processor 19 so that the user with the service processor login ID may use the function of the remote console.

The proxy control unit 23 of the SP proxy 13 then logs in via a Web screen of the remote console by using the service processor login ID (S909).

Next, the proxy control unit 23 obtains an application for using the remote console function and service ticket information for connection to the remote console (S910). The application for using the remote console function is, for example, a java application. The service ticket is, for example, key information for accessing the remote console function.

The proxy control unit 23 then performs port transfer setting for allowing communication between the user terminal 15 and the service processor 19.

Next, the proxy control unit 23 transfers the application and the service ticket to the user terminal 15 (S911).

Next, the user terminal 15 executes the application received at S911 and opens a session by using the service ticket, thereby connecting to the service processor 19 with the remote console (S912).

Figure 13:
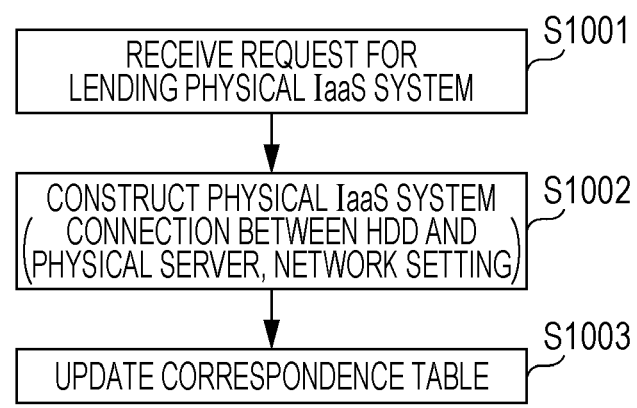
FIG. 13 is a diagram illustrating an example of an operation flow of a physical IaaS system when a request for lending the physical IaaS system occurs, according to an embodiment.

Next, an operation flow is described when the correspondence between the logical servers 35 and the physical servers 11 is changed. The correspondence between the logical servers 35 and the physical servers 11 is changed when a request for lending the physical IaaS system or a request for returning the same occurs from the user. FIG. 13 is an operation flow of the physical IaaS system when a request for lending the physical IaaS system occurs.

Upon receiving a request for lending a physical IaaS system from the user terminal 15 (S1001), the connection changing unit 38 constructs a physical IaaS system so that the logical platform 37 is configured as defined by the user (S1002). Specifically, the connection changing unit 38 connects the HDD 22 where the information about the system of the logical server 35 included in the logical platform 37 is stored and the physical server 11 to each other. Also, the connection changing unit 38 sets the VLAN and so forth so that the network structure is configured as defined by the logical platform 37.

Next, the connection changing unit 38 instructs the logical server managing unit 29 of the management server 14 to update the correspondence table (S1003). Specifically, the connection changing unit 38 notifies the logical server managing unit 29 that the information about the correspondence between the HDDs and the physical servers connected so as to construct a logical platform requested by the user to be lent is set to the correspondence table 31. Upon receiving the correspondence table updating instruction, the logical server managing unit 29 sets, to the correspondence table 31, the information about the correspondence between the HDDs and the physical servers connected so as to construct a logical platform requested by the user to be lent.

When a request for returning the physical IaaS comes from the user, the connection changing unit 38 cancels the connection between the HDD 22 and the physical server 11 regarding the logical platform 37 to be returned by the user. The connection changing unit 38 also cancels the setting of the VLAN and so forth regarding the network structure defined by the logical platform 37. The connection changing unit 38 then notifies the logical server managing unit 29 that the correspondence between the HDD 22 where the system information of the logical server included in the logical platform 37 to be returned from the user is stored and the physical server 11 on the correspondence table 31 is cancelled. Upon receiving the correspondence table updating instruction, the logical server managing unit 29 updates the correspondence table 31 so as to cancel the correspondence between the HDD 22 where the system information of the logical server included in the logical platform 37 to be returned from the user is stored and the physical server.

According to the embodiment, when switching of connection between the physical server 11 and the HDD 22 occurs, a system administrator does not have to change settings, such as the login ID, of the service processor 19, and the user may use the service processer 19.

Also, in the embodiment, the login ID is set to the service processor 19 for each use authority, and the physical server 11 allocated to the user and the user's service processor use authority are managed by the management server 14. This allows the function of the service processor 19 to be provided according to the user's use authority.

Furthermore, in the embodiment, the proxy server substitutes to log in to the service processor 19. With this, the actual service processor login ID is hidden from the user to enhance confidentiality. Also, a change of user's use authority is facilitated, and operation business at the data center is saved.

When authority of the login ID requested by the user to be used has already been set to the service processor 19, setting of authority by the SP setting unit 25 (S708, S808, and S908) may be omitted. Whether authority of the login ID has already been set to the service processor 19 may be managed, for example, in correspondence with the SP login ID in the user DB 33.

Furthermore, unlike setting an account of the service processor after a request for using a service processor comes from the user, an account according to use authority may be set in the service processor in advance. In this case, the set login ID of the service processor is stored in the service processor login ID 1304 of the user DB 33. In this case, setting of authority by the SP setting unit 25 (S708, S808, and S908) may be omitted.

The physical IaaS system 130 is an example of the information processing system 51. The user terminal 15 is an example of the terminal device 52. The physical server DB 32 is an example of the first storage unit 54. The correspondence table 31 is an example of the second storage unit 55. The management server 14 is an example of the management device 56. The SP proxy 13 is an example of the proxy device 57. The user DB 33 is an example of the third storage unit 58. The HDD 22 is an example of the storage device 60. The service processor 19 is an example of the managing unit 61. The physical server 11 is an example of the processing device 62. The connection changing unit 38 is an example of the connection changing unit 63. The user authenticating unit 27 is an example of the authenticating unit 64. The SP login substituting unit 24 is an example of the substituting unit 65. The SP setting unit 25 is an example of the first setting unit 66. The disk pool 21 including the HDDs 22 and the physical server 11 may be configured to be included in the same device, and this device is an example of the information processing device 53.

Second Embodiment

There may be the case where, from a predetermined logical server 35 included in the logical platform 37 defined by the user, the service processor 19 of the predetermined logical server 35 or another logical server 35 is desired to be accessed to monitor the soundness of the logical server 35 in the logical platform 37 and control a power supply state.

Thus, in the embodiment, to allow access from the logical server 35 to the service processor 19, the business network and the management network are connected to each other via the firewall 20. Then, upon request from the user, the SP proxy 13 changes setting of access control of the firewall 20.

Figure 14:
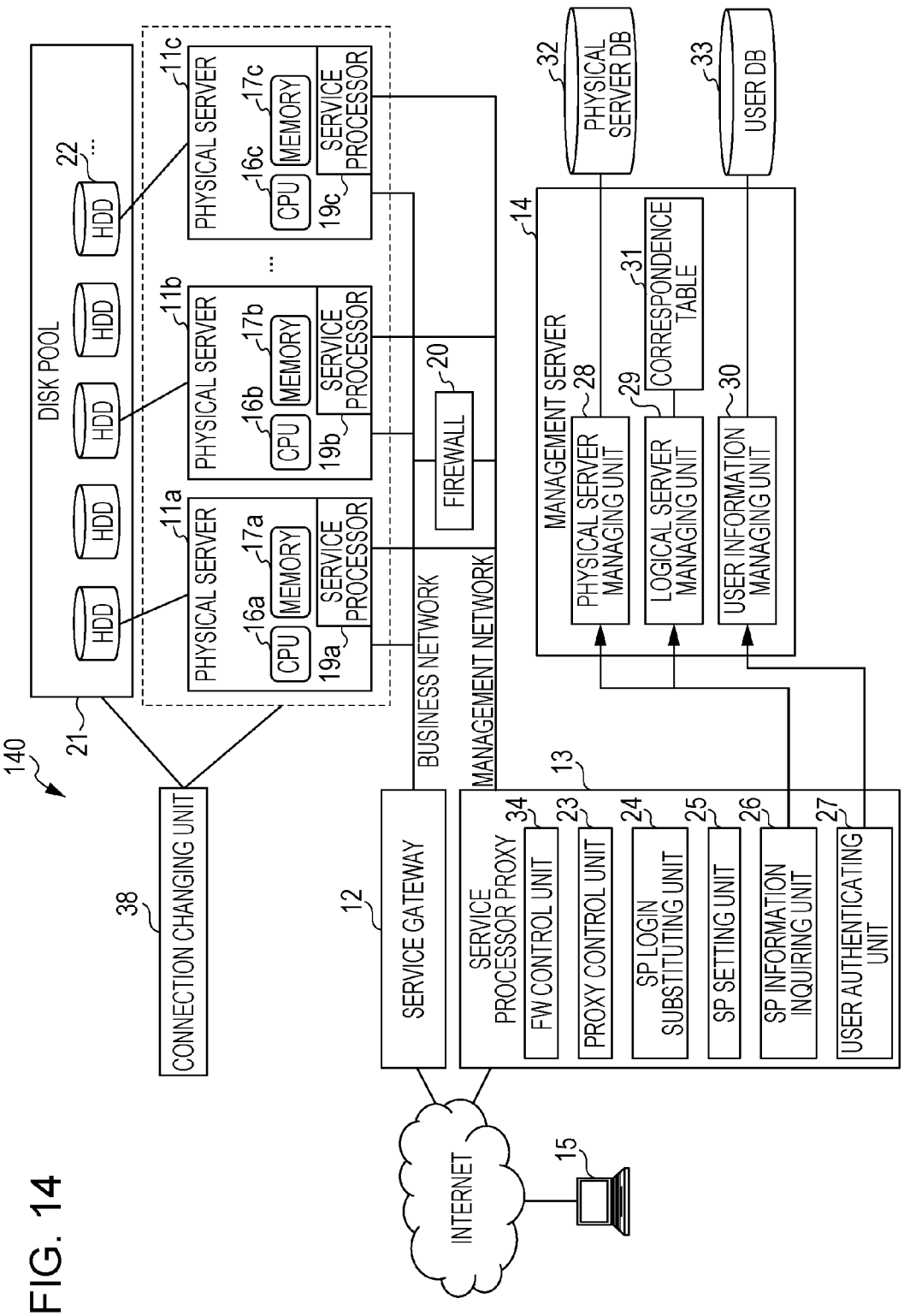
FIG. 14 is a diagram illustrating an example of structure of a physical IaaS system where physical servers and HDDs are separated from each other and a business network and a management network are connected to each other via a firewall, according to an embodiment.

FIG. 14 depicts an example of structure of the physical IaaS system where physical servers and HDDs are separated from each other and the business network and the management network are connected to each other via a firewall.

The physical IaaS system 140 includes the physical server 11, the service gateway 12, the SP proxy 13, the management server 14, the user terminal 15, the disk pool 21, the connection changing unit 38, the physical server DB 32, the user DB 33, and the firewall 20. The physical server 11, the service gateway 12, the management server 14, the user terminal 15, the disk pool 21, the connection changing unit 38, the physical server DB 32, and the user DB 33 are similar to those of the first embodiment depicted in FIG. 6.

The firewall 20 connects the business network and the management network to each other, and controls access from both networks. Access control of the firewall 20 is performed, for example, based on a combination of a transmission source IP address, a transmission destination IP address, a transmission source port number, and a transmission destination port number.

As with the first embodiment, the SP proxy 13 includes the proxy control unit 23, the SP login substituting unit 24, the SP setting unit 25, the SP information inquiring unit 26, and the user authenticating unit 27. The SP proxy 13 of the second embodiment further includes a FW control unit 34.

Upon receiving from the user terminal 15 a request for changing setting of access control of the firewall 20, the FW control unit 34 sets access control of the firewall 20. The request for changing setting of access control includes user's identification information and, regarding access for setting change, the IP address of the transmission source logical server 35, identification information of the destination logical server 35, and information about a connection mode.

Upon receiving the setting change request from the user terminal 15, the FW control unit 34 instructs the user authenticating unit 27 to authenticate whether the setting change request has come from an authorized user, and receives the authentication result.

When authentication by the user authenticating unit 27 is successful, the FW control unit 34 instructs the SP information inquiring unit 26 to specify the service processor 19 of the destination logical server 35 and, as a result, receives the IP address of the service processor 19. The FW control unit 34 also instructs the SP information inquiring unit 26 to specify the transmission source physical server 11 corresponding to the transmission source logical server 35 and, as a result, receives the IP address of the transmission source physical server 11 corresponding to the transmission source logical server 35.

The FW control unit 34 then instructs the SP setting unit 25 to provide the user making the setting change request to the specified service processor 19 with authority in the connection mode included in the setting change request.

The user authenticating unit 27 performs authentication of whether the user making the setting change request has authority, in a manner similar to that of authentication of whether the user making the use request for the service processor 19 in the first embodiment has use authority over the service processor 19.

The SP information inquiring unit 26 also specifies the service processor 19 of the destination logical server 35 in a manner similar to that of specifying the service processor requested by the user to be used in the first embodiment. The SP information inquiring unit 26 further specifies the transmission source physical server 11 corresponding to the transmission source logical server 35 in a manner similar to that of specifying the physical server ID corresponding to the logical server requested to be used in the first embodiment.

Still further, the SP setting unit 25 provides the user making the setting change request with authority in the connection mode included in the setting change request, in a manner similar to that of authentication (account) setting in the first embodiment.

Next, the FW control unit 34 sets the firewall 20 so as to allow communication in the connection mode from the IP address of the transmission source logical server 35 to the IP address of the destination service processor 19. Here, the FW control unit 34 sets the firewall 20 by specifying the IP address of the transmission source physical server 11, the IP address of the destination service processor 19, and a port number corresponding to the connection mode. The IP address of the transmission source physical server 11 and the IP address of the destination service processor 19 are received from the SP information inquiring unit 26. The port number is specified based on the information about the connection mode included in the setting change request.

Next, the FW control unit 34 presents, to the user terminal 15, information for accessing the service processor 19 from the relevant logical server 35. The information for accessing the service processor 19 from the logical server 35 includes the IP address of the service processor 19, the login ID, and so forth.

Then, for example, the user sets the obtained information to an application on the logical server 35, thereby making it possible to access the service processor 19 from the application on the logical server 35.

With this structure, access is easily made from the assigned physical server 11 to the service processor 19.

Also, the method of logging in from the user terminal 15 to the service processor 19 is similar to that of the first embodiment.

Figure 15:
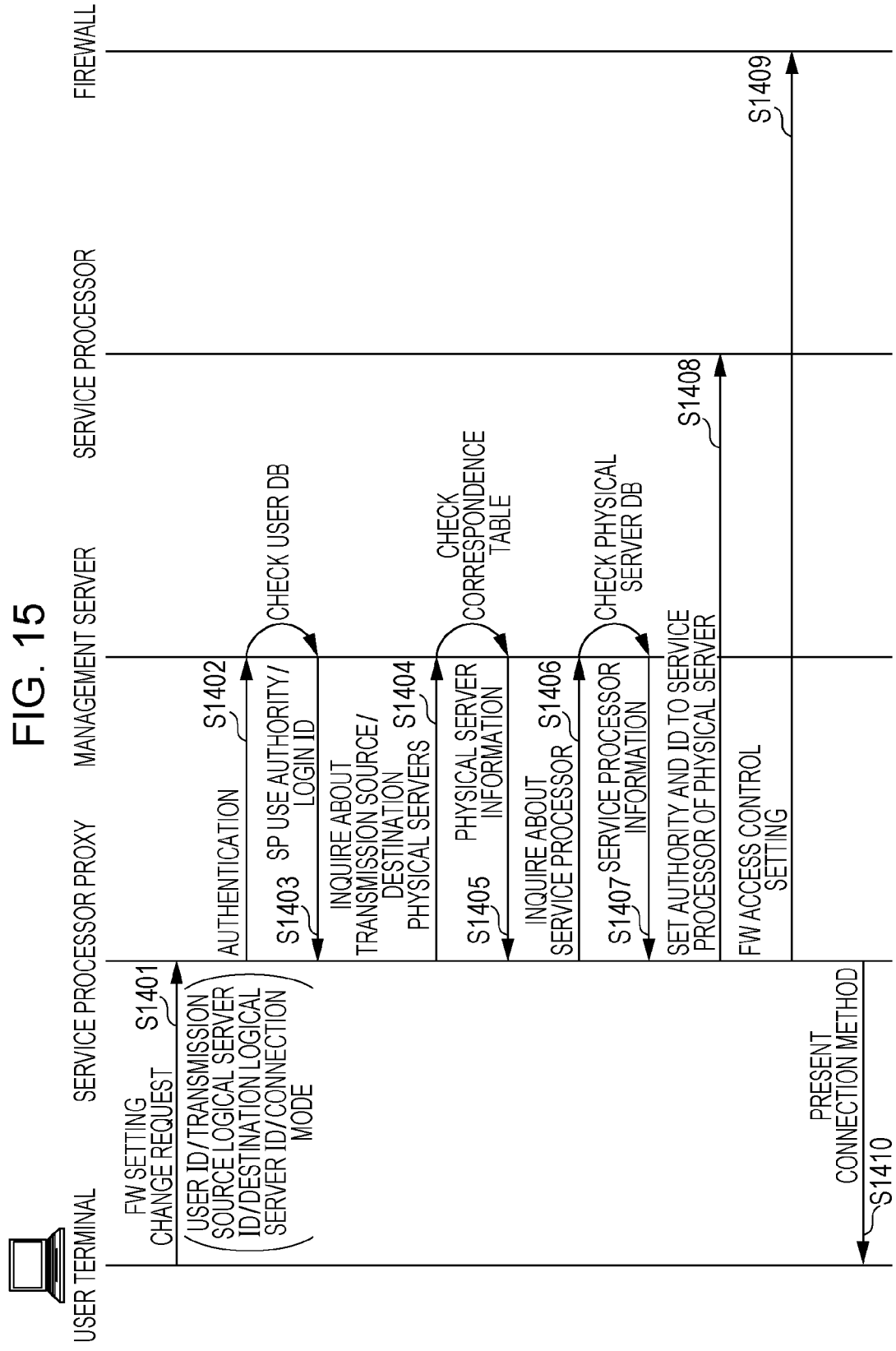
FIG. 15 is a diagram illustrating an example of an operation flow when a request for changing firewall settings occurs, according to an embodiment.

FIG. 15 is an operation flow when a request for changing firewall settings occurs. FIG. 15 depicts an example when "Web UI" is set as a connection mode of the setting change request. In the following description, the IP address of the physical server 11 corresponding to the transmission source logical server 35 may be referred to as a transmission source IP address, and the IP address of the service processor 19 of the physical server 11 corresponding to the destination logical server 35 may be referred to as a destination IP address.

First, the FW control unit 34 of the SP proxy 13 receives from the user terminal 15 a request for changing the setting of access control of the firewall 20 (S1401).

Next, the SP proxy 13 authenticates whether the setting change request has come from an authorized user (S1402). That is, the user authenticating unit 27 of the SP proxy 13 inquires of the user information managing unit 30 of the management server 14 about use authority over the service processor 19 requested to be used by the user making the setting change request.

Upon receiving the inquiry, the management server 14 specifies user information and information about service processor use authority based on the information stored in the user DB 33, and notifies the SP proxy 13 of the specified information (S1403). Specifically, the user information managing unit 30 of the management server 14 refers to the user DB 33 to notify the user authenticating unit 27 of user's use authority over the service processor 19 corresponding to the destination logical server 35 requested to be used by the user and the service processor login ID.

Upon receiving the notification from the user information managing unit 30, the user authenticating unit 27 determines based on the received user's use authority, whether the user has authority indicated by the connection mode included in the use request. When it is determined that the user does not have authority, the FW control unit 34 notifies the user terminal 15 that the user does not have authority, and the process ends. When it is determined that the user has authority, processes at S1404 onward are performed.

Next, the SP proxy 13 inquires about the physical servers 11 corresponding to the transmission source logical server 35 and the destination logical server 35 (S1404). That is, the SP information inquiring unit 26 of the SP proxy 13 inquires of the logical server managing unit 29 of the management server 14 about the IDs of the physical servers 11 corresponding to the transmission source logical server 35 and the destination logical server 35.

Upon receiving the inquiry about the physical server IDs, the management server 14 specifies information about the physical servers 11 based on the correspondence table 31, and notifies the SP proxy 13 of the specified information (S1405). Specifically, the logical server managing unit 29 of the management server 14 refers to the correspondence table 31 to specify the IP addresses of the physical servers 11 corresponding to the transmission source logical server 35 and the destination logical server 35. The logical server managing unit 29 then notifies the SP information inquiring unit 26 of the IP addresses of the specified physical servers 11. In the example of FIG. 8, the physical server ID 1201 in the correspondence table 31 is represented as the IP address of the physical server 11. Here, if the physical server ID 1201 is represented by identification information other than the IP address, a data item for the physical server IP address corresponding to the physical server ID may be provided to the correspondence table 31.

Next, the SP proxy 13 inquires about the IP address of the service processor 19 (S1406). That is, the SP information inquiring unit 26 of the SP proxy 13 inquires of the physical server managing unit 28 of the management server 14 about the IP address of the service processor 19 of the physical server 11 corresponding to the destination logical server 35 specified at S1405.

Upon receiving the inquiry about the service processor 19, the management server 14 specifies information about the service processor 19 based on the information stored in the physical server DB 32, and notifies the SP proxy 13 of the specified information (S1407). Specifically, the physical server managing unit 28 of the management server 14 refers to the physical server DB 32 to specify the IP address of the service processor 19 corresponding to the physical server 11. The logical server managing unit 29 then notifies the SP information inquiring unit 26 of the specified IP address of the service processor 19.

Next, the SP proxy 13 sets the ID (account) of a login user and user authority of that ID to the service processor 19 of the physical server 11 (S1408). That is, the SP setting unit 25 of the SP proxy 13 sets the service processor 19 so that the user with the service processor login ID notified at S1403 may use the function indicated by the connection mode of the setting change request.

S1408 and S1409 may be omitted if the ID of the login user and user authority of that ID have already been set. The SP setting unit 25 of the SP proxy 13 may allow the user with the service processor login ID to use the function indicated by the connection mode not only by setting user authority but also by using any of various methods, such as creating a user account, or lock cancelling.

Next, the SP proxy 13 changes settings of access control of the firewall 20 (S1409). That is, the FW control unit 34 sets the firewall 20 based on the IP address of the transmission source physical server received at S1405, the IP address of the service processor 19 received at S1407, and a port number corresponding to the connection mode included in the setting change request. Specifically, the FW control unit 34 sets the firewall 20 so as to permit communication (inbound and outbound) with a combination of the transmission source IP address, a connection port with the transmission source IP address, the destination IP address, and a connection port with the destination IP address.

Next, the SP proxy 13 provides the user terminal 15 with information for connecting from the transmission source logical server 35 to the service processor 19 (S1410). That is, the FW control unit 34 notifies the user terminal 15 of the destination IP address and the user account ID.

The user terminal 15 then logs in to the transmission source logical server 35 to specify the destination IP address from the transmission source logical server 35 for connection with the service processor 19, and uses the user account ID to log in to the service processor 19.

If the IP address of the transmission source logical server 35 is configured of a virtual IP and the IP address of the physical server 11 and the IP address set to the logical server 35 are identical to each other, the process of finding the transmission source IP address at S1404 and S1405 may be omitted.

In setting the firewall at S1409, the SP proxy 13 may be specified as the destination IP address in place of directly specifying the IP address of the service processor 19. In this case, the transmission source logical server 35 is permitted to communicate with the SP proxy 13, and the transmission source logical server 35 uses the login substituting function by the service processor 19 described in the first embodiment to establish connection with the service processor 19. Also in this case, the firewall 20 may be installed between the business network and the SP proxy 13, and the business network may be configured not to be directly connected to the management network. That is, the management network may be accessed from the business network via the SP proxy 13. The firewall 20 is an example of the firewall 59. The FW control unit 34 is an example of the second setting unit 67.

Figure 16:
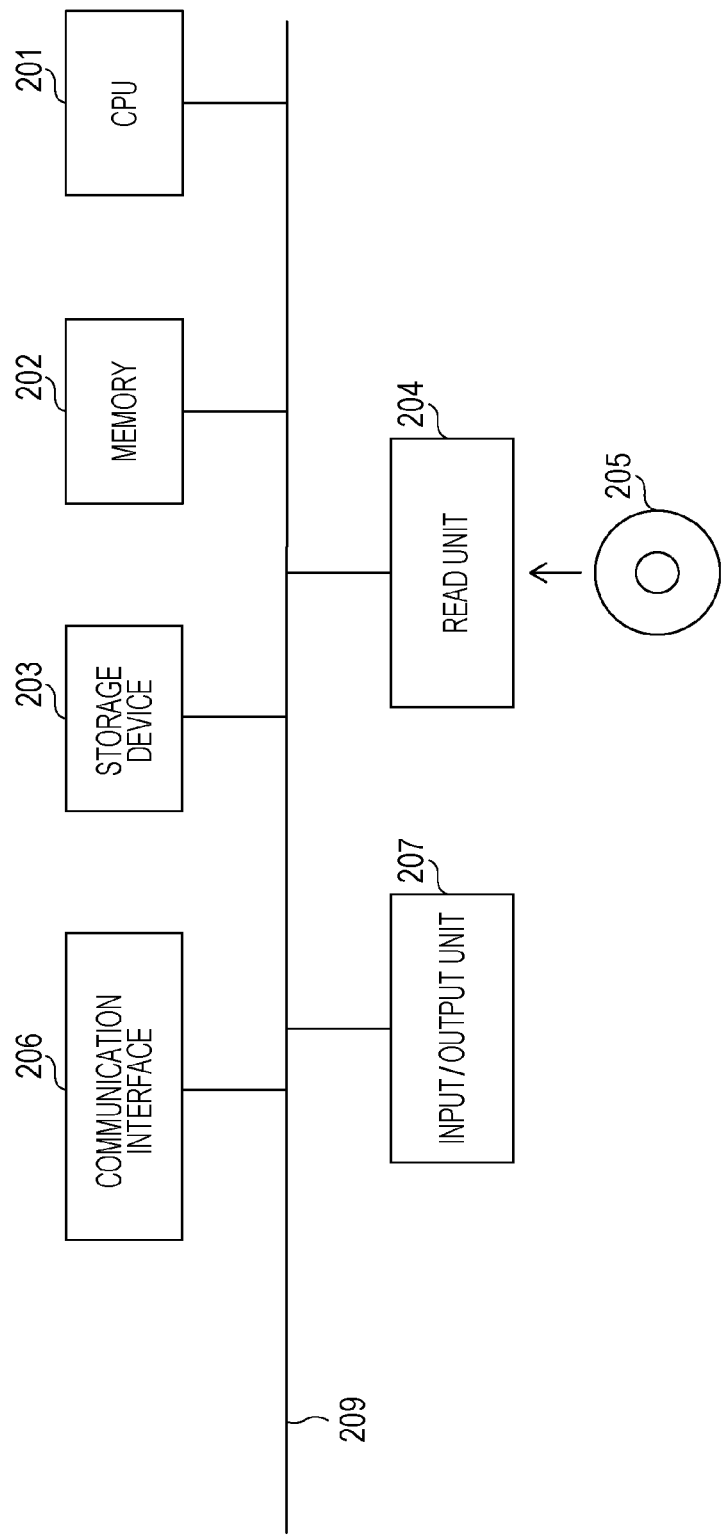
FIG. 16 is a diagram illustrating an example of hardware structure of a service processor proxy, a management server, a user terminal, and a connection changing unit, according to an embodiment.

FIG. 16 depicts an example of hardware structure of the SP proxy 13, the management server 14, the user terminal 15, and the connection changing unit 38, according to an embodiment. The SP proxy 13, the management server 14, and the connection changing unit 38 each includes a CPU 201, a memory 202, a storage device 203, a read unit 204, a removable recording medium 205, a communication interface 206, and an input/output unit 207. The CPU 201, the memory 202, the storage device 203, the read unit 204, the communication interface 206, and the input/output unit 207 are connected to each other via a bus 209, for example.

The CPU 201 uses the memory 202 to execute a program according to the procedure of the flowcharts described above. In the SP proxy 13, the CPU 201 provides part or all of the functions of the proxy control unit 23, the SP login substituting unit 24, the SP setting unit 25, the SP information inquiring unit 26, the user authenticating unit 27, and the FW control unit 34. Also, in the management server 14, the CPU 201 provides part or all of the functions of the physical server managing unit 28, the logical server managing unit 29, and the user information managing unit 30.

The memory 202 is, for example, a semiconductor memory, and is configured to include a random access memory (RAM) area and a read only memory (ROM) area.

The storage device 203 is, for example, a hard disk. In the management server 14, the correspondence table 31 is stored in the storage device 203. When the physical server DB 32 or the user DB 33 is included in the management server 14, the physical server DB 32 or the user DB 33 is stored in the storage device 203. In the managing unit 38, information in the storage unit such as structure information of the logical platform for each user is stored in the storage device 203. The storage device 203 may be a semiconductor memory such as a flash memory. The storage device 203 may be an external recording device. The storage device 203 may be omitted from the SP proxy 13 and the user terminal 15.

The read unit 204 accesses the removable recording medium 205 by following an instruction from the CPU 201. The removable recording medium 205 is embodied by, for example, a semiconductor device (such as a USB memory), a medium where information is inputted and outputted by a magnetic action (such as a magnetic disk), or a medium where information is inputted and outputted by an optical action (such as a CD-ROM or DVD). The read unit 204 may be omitted from the SP proxy 13, the management server 14, the user terminal 15, and the connection changing unit 38.

The communication interface 206 transmits and receives data via a network by following an instruction from the CPU 201.

The input/output unit 207 is equivalent to, for example, a device which accepts an instruction from the user. The user uses the input/output unit 207 to input various instructions to the user terminal 15. The input/output unit 207 may be omitted from the SP proxy 13, the management server 14, and the connection changing unit 38.

An information processing program according to embodiments is provided to the server, for example, in any of the following forms:
(1) installed in advance in the storage device 203;
(2) provided by the removable recording medium 205; and
(3) provided via a network.

Embodiments are not restricted to the embodiments described above, and any of various structures and embodiments may be taken within a range not deviating from the gist of the embodiments described above.

Figure 17:
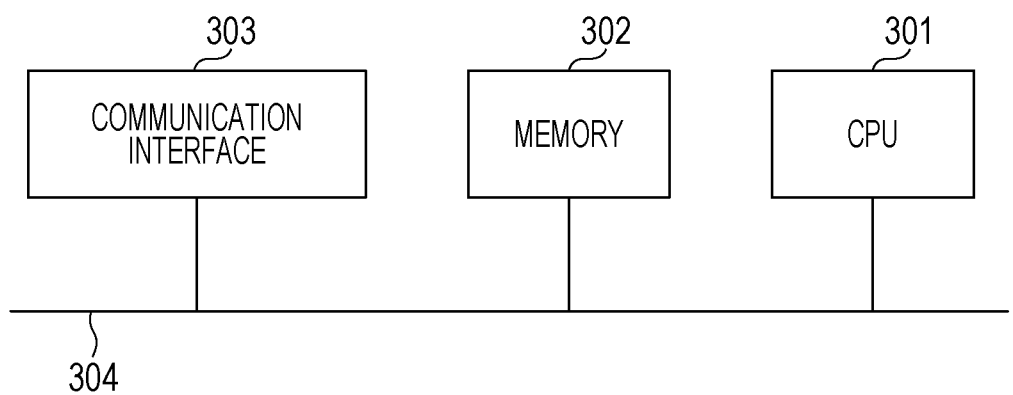
FIG. 17 is a diagram illustrating an example of hardware structure of a service gateway and a firewall, according to an embodiment.

FIG. 17 depicts an example of hardware structure of the service gateway 12 and the firewall 20, according to an embodiments. The service gateway 12 and the firewall 20 each include a CPU 301, a memory 302, and a communication interface 303. The CPU 301, the memory 302, and the communication interface 303 are connected to each other via a bus 304, for example.

The CPU 301 uses the memory 302 for various controls.

The memory 302 is, for example, a semiconductor memory, and is configured to include a RAM area and a ROM area. In the service gateway 12, the gateway route table and so forth are stored in the memory 302. In the firewall 20, a table where a rule for controlling access is written is stored in the memory 302.

The communication interface 306 receives and transmits data from and to a network.

The physical server 11, the disk pool 21, and the connection changing unit 38 may be configured to be included in the same housing. Also, part or all of the functions of the management server 14 may be included in the connection changing unit 38. Furthermore, part or all of the functions of the connection changing unit 38 may be included in the management server 14. Still further, part or all of the functions of the management server 14 may be included in the SP proxy 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system where a logical information processing device is allocated based on a request from a terminal device, the system comprising:
   an information processing device in which one of a plurality of storage devices is connected to one of a plurality of processing devices each including a managing unit;
   a first storage unit configured to store first correspondence information that stores physical identification information identifying the information processing device in association with address information of the managing unit;
   a second storage unit configured to store second correspondence information that stores the physical identification information in association with logical identification information identifying the logical information processing device;
   a managing device configured to acquire address information of the managing unit of the information processing device corresponding to the logical information processing device allocated to the terminal device, by using the physical identification information that is obtained from the second correspondence information based on the logical identification information included in the request; and
   a proxy device configured to access the managing unit of the corresponding information processing device, based on the address information acquired by the managing device.

2. The system of claim 1, wherein
   the managing device further includes a connection changing unit configured to change the second correspondence information in response to a change of a connection between the storage device and the processing device.

3. The system of claim 2, wherein
   when the storage device corresponding to the logical information processing device is connected to a predetermined one of the processing devices in response to the request, the connection changing unit changes the second correspondence information so that the logical identification information of the logical information processing device corresponding to the connected storage device is associated with the physical identification information of the connected information processing device.

4. The system of claim 3, wherein
   when a connection between the storage device corresponding to the logical information processing device and the predetermined one of the processing devices is cancelled based on the request, the connection changing unit changes the second correspondence information so that a correspondence between the logical identification information of the logical information processing device corresponding to the storage device for which the connection has been cancelled and the physical identification information of the information processing device for which the connection has been cancelled is cancelled.

5. The system of claim 1, further comprising:
   a third storage unit configured to store authority information for giving the terminal device authority to use the managing unit, wherein the proxy device includes an authenticating unit configured to authenticate the terminal device based on the authority information; and when the authentication is successful, the managing device acquires, from the first correspondence information, the address information of the managing unit of the information processing device corresponding to the logical information processing device allocated to the terminal device, by using the physical identification information that is obtained from the second correspondence information, based on the logical identification information included in the request.

6. The system of claim 5, wherein
the proxy device:
further includes a substituting unit configured to substitute to log in from the terminal device to the managing unit corresponding to the obtained address information; and
provides an interface for accessing the managing unit of the corresponding information processing device, in a login state, based on the address information acquired by the managing device.

7. The system of claim 1, wherein
the proxy device:
further includes a first setting unit configured to set use authority to the managing unit corresponding to the address information; and
accesses the managing unit of the corresponding information processing device with the set use authority, based on the address information acquired by the managing device.

8. The system of claim 1, further comprising:
a firewall configured to connect a connection network of a network interface of the processing devices and a connection network of a network interface of the managing unit, wherein
the proxy device:
further includes a second setting unit configured to set the firewall so as to permit access from the network interface of the processing device to the managing unit of the corresponding information processing device; and
provides information for accessing the managing unit of the corresponding information processing device from the network interface of the access-permitted processing device.

9. A method for controlling a system in which a logical information processing device is allocated based on a request from a terminal device, the system including:
an information processing device in which one of a plurality of storage devices is connected to one of a plurality of processing devices each including a managing unit,
a first storage unit configured to store first correspondence information that stores physical identification information identifying the information processing device in association with address information of the managing unit, and
a second storage unit configured to store second correspondence information that stores the physical identification information in association with logical identification information identifying a logical information processing device, the method comprising:
acquiring, by a managing device included in the system, address information of the managing unit of the information processing device corresponding to the logical information processing device allocated to the terminal device, by using the physical identification information that is obtained from the second correspondence information based on the logical identification information included in the request; and
accessing, by a proxy device included in the system, the managing unit of the corresponding information processing device based on the address information acquired by the managing device.

10. The method of claim 9, wherein
a connection changing unit included in the managing device changes the second correspondence information in response to a change of a connection between the storage device and the processing device.

11. The method of claim 10, wherein
when the storage device corresponding to the logical information processing device is connected to a predetermined one of the processing devices in response to the request, the connection changing unit changes the second correspondence information so that the logical identification information of the logical information processing device corresponding to the connected storage device is associated with the physical identification information of the connected information processing device.

12. The method of claim 11, wherein
when a connection between the storage device corresponding to the logical information processing device and the predetermined one of the processing devices is cancelled based on the request, the connection changing unit changes the second correspondence information so that a correspondence between the logical identification information of the logical information processing device corresponding to the storage device for which the connection has been cancelled and the physical identification information of the information processing device for which the connection has been cancelled is cancelled.

13. The method of claim 9, further comprising:
authenticating, by an authenticating unit included in the proxy device, the terminal device, based on authority information for giving the terminal device authority to use the managing unit, wherein
when the authentication is successful, the managing device acquires, from the first correspondence information, the address information of the managing unit of the information processing device corresponding to the logical information processing device allocated to the terminal device, by using the physical identification information that is obtained from the second correspondence information based on the logical identification information included in the request.

14. The method of claim 13, further comprising:
substituting, by a substituting unit, to log in from the terminal device to the managing unit corresponding to the obtained address information; and
providing, by the proxy device, an interface for accessing the managing unit of the corresponding information processing device, in a login state, based on the address information acquired by the managing device.

15. The method of claim 9, further comprising:
setting, by a first setting unit included in the proxy device, use authority to the managing unit corresponding to the address information; and
accessing, by the proxy device, the managing unit of the corresponding information processing device with the set use authority, based on the address information acquired by the managing device.

* * * * *